US012647865B2

(12) United States Patent
Sambhwani et al.

(10) Patent No.: US 12,647,865 B2
(45) Date of Patent: Jun. 2, 2026

(54) SEAMLESS MOBILITY FOR WIRELESS DEVICES

(71) Applicant: Apple Inc., Cupertino, CA (US)

(72) Inventors: Sharad Sambhwani, San Diego, CA (US); Pranav Tripathi, San Jose, CA (US); Dirk Nickisch, Oberpframmern (DE); Sanjeevi Balasubramanian, San Jose, CA (US); Dhiraj J Shirke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 666 days.

(21) Appl. No.: 17/929,219

(22) Filed: Sep. 1, 2022

(65) Prior Publication Data

US 2023/0354137 A1      Nov. 2, 2023

Related U.S. Application Data

(60) Provisional application No. 63/336,467, filed on Apr. 29, 2022.

(51) Int. Cl.
| | |
|---|---|
| *H04W 36/32* | (2009.01) |
| *H04W 16/28* | (2009.01) |
| *H04W 36/00* | (2009.01) |
| *H04W 36/08* | (2009.01) |
| *H04W 36/30* | (2009.01) |

(52) U.S. Cl.
CPC ....... *H04W 36/32* (2013.01); *H04W 36/0085* (2018.08); *H04W 36/08* (2013.01); *H04W 36/30* (2013.01); *H04W 16/28* (2013.01)

(58) Field of Classification Search
CPC .................... H04W 4/00–029; H04W 4/30–48
See application file for complete search history.

(56) References Cited

U.S. PATENT DOCUMENTS

| | | | |
|---|---|---|---|
| 9,591,546 B2 | 3/2017 | Li | |
| 9,860,815 B2 | 1/2018 | Yi et al. | |
| 10,271,252 B2 | 4/2019 | Jung et al. | |
| 10,349,372 B2* | 7/2019 | Lee | ........................ H04W 64/00 |

(Continued)

FOREIGN PATENT DOCUMENTS

| | | |
|---|---|---|
| WO | 2017196362 A1 | 11/2017 |
| WO | 2021016787 A1 | 2/2021 |

*Primary Examiner* — San Htun
(74) *Attorney, Agent, or Firm* — FLETCHER YODER PC

(57) ABSTRACT

User equipment may include a transmitter and a receiver coupled to an antenna to enable the user equipment to transmit and receive user data with a base station of the wireless network. However, the user equipment may perform power-consuming searches to determine a base station for connection. Furthermore, the connection may be affected by blockages and transitions during mobility scenarios. As such, it may be beneficial for the user equipment to implement mobility procedures. For example, the user equipment may form links with multiple base stations of a cell cluster for transitioning. In another example, the wireless network may generate a map with locations of base stations and beam characteristics for the user equipment to determine coverage areas and decrease a number of transitions. Still in another example, the user equipment may receive blockage information to predict a blockage and implement mobility procedures to maintain wireless service during a blockage.

20 Claims, 11 Drawing Sheets

(56)  References Cited

U.S. PATENT DOCUMENTS

| | | | |
|---|---|---|---|
| 10,863,474 B2 | 12/2020 | Raghavan et al. | |
| 11,243,290 B2 | 2/2022 | Mohammadi et al. | |
| 11,246,078 B2 | 2/2022 | Çetinkaya et al. | |
| 11,350,293 B2 | 5/2022 | Tadayon et al. | |
| 2014/0057634 A1* | 2/2014 | Chang | H04W 36/0085 |
| | | | 455/437 |
| 2015/0304913 A1* | 10/2015 | Uusitalo | H04W 4/02 |
| | | | 455/444 |
| 2015/0349863 A1* | 12/2015 | El Ayach | H04B 7/0408 |
| | | | 375/295 |
| 2016/0380820 A1 | 12/2016 | Horvitz et al. | |
| 2019/0082334 A1 | 3/2019 | Nagaraja | |
| 2019/0132778 A1* | 5/2019 | Park | H04W 16/28 |
| 2019/0357111 A1 | 11/2019 | Huberman et al. | |
| 2020/0178137 A1* | 6/2020 | Hassan Hussein | |
| | | | H04W 36/00837 |
| 2020/0259575 A1 | 8/2020 | Bai | |
| 2021/0120434 A1* | 4/2021 | Wang | H04W 72/046 |
| 2021/0314963 A1 | 10/2021 | Sharma et al. | |
| 2021/0320712 A1 | 10/2021 | Goettle | |
| 2021/0410135 A1 | 12/2021 | Yu | |
| 2022/0077896 A1* | 3/2022 | Jung | H04W 48/20 |
| 2022/0124668 A1 | 4/2022 | Barbu | |
| 2022/0303843 A1* | 9/2022 | Yajnanarayana | |
| | | | H04W 36/00835 |

* cited by examiner

| PROCESSOR | 12 |
| MEMORY | 14 |
| STORAGE | 16 |
| DISPLAY | 18 |
| INPUT STRUCTURES | 22 |
| I/O INTERFACE | 24 |
| NETWORK INTERFACE | 26 |
| TRANSCEIVER | 30 |
| POWER SOURCE | 29 |

10

PROCESSOR — 12
MEMORY — 14
TRANSMITTER — 52
RECEIVER — 54
30
56
55A
55N
10

SEAMLESS MOBILITY FOR WIRELESS DEVICES

CROSS-REFERENCE TO RELATED APPLICATION

This application claims the benefit of U.S. Provisional Application No. 63/336,467, entitled "Seamless Mobility Solutions," filed on Apr. 29, 2022, which is incorporated herein by reference in its entirety for all purposes.

BACKGROUND

The present disclosure relates generally to wireless communication, and more specifically to maintaining wireless communication service to user equipment (e.g., mobile wireless communication devices).

User equipment may include a transmitter and a receiver coupled to one or more antennas wirelessly couple (e.g., enable wireless signal transmission and/or reception) with a wireless network (e.g., including one or more base stations supporting one or more cells). To detect a base station, the user equipment may perform power-consuming search procedures, such as scanning over a frequency range to detect the base station. Then, the user equipment may join the wireless network by communicatively coupling to the base station. However, performance on the network, as measured by a signal characteristic (e.g., strength or quality), may be affected by any number of factors, such as movement of the user equipment, obstructions or blockages between the user equipment and the base station, or the like.

For example, in high frequency networks (e.g., having millimeter wave (mmWave) or sub-terahertz (sub-THz) frequencies), coverage may be limited to certain areas. As the user equipment moves, the user equipment may enter or leave multiple coverage areas supported by multiple base stations, resulting in transitions (e.g., handovers) of service from a currently coupled base station to a target base station. Such frequent handovers may cause signal delays and/or service interruptions. Further, the signal characteristic may depend on a path (e.g., a line of sight) between the user equipment and the connected base station. When the line of sight is blocked, the signal characteristic may decrease, or in some instances, the connection between the user equipment and the base station may be interrupted. Accordingly, mobility procedures that maintain wireless communication service to user equipment may be desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment may include one or more antennas, a transceiver coupled to the one or more antennas, and processing circuitry coupled to the transceiver. The processing circuitry may be configured to detect a first base station using the transceiver, synchronize to the first base station, and send or receive user data via the one or more antennas using the transceiver to or from the first base station. The processing circuitry may also be configured to receive a map using the transceiver, the map indicating a location of each base station of a plurality of base stations and a beam coverage area of each base station of the plurality of base stations, request transitioning to send or receive the user data to or from a second base station using the transceiver based on a predicted route of the user equipment and the map, and send or receive the user data via the one or more antennas using the transceiver to or from the second base station based on a response to the request.

In another embodiment, a base station may include a transmitter, a receiver, and processing circuitry coupled to the transmitter and receiver. The processing circuitry may be configured to generate a map indicating a location of each base station of a plurality of base stations and a beam coverage area of each base station of the plurality of base stations, determine or receive a first indication of a location of an user equipment using the receiver, and transmit a portion of the map to the user equipment based on the location of the user equipment using the transmitter. The processing circuitry may also be configured to receive a second indication of a request from the user equipment to transition to a second base station using the receiver, and transition the user equipment to the second base station.

In yet another embodiment, a method for wireless communications may include receiving, at a user equipment, a map from a first base station indicating a location of each base station of a plurality of base stations and a beam coverage area of each base station of the plurality of base stations, and predicting, by the user equipment, a route of the user equipment based on a location of the user equipment. The method may also determine, by the user equipment, a second base station of the plurality of base stations for transitioning based on the map and the route, transmit a request to transition to the second base station, and communicate with the second base station based on a response to the request.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figures 1, 2:
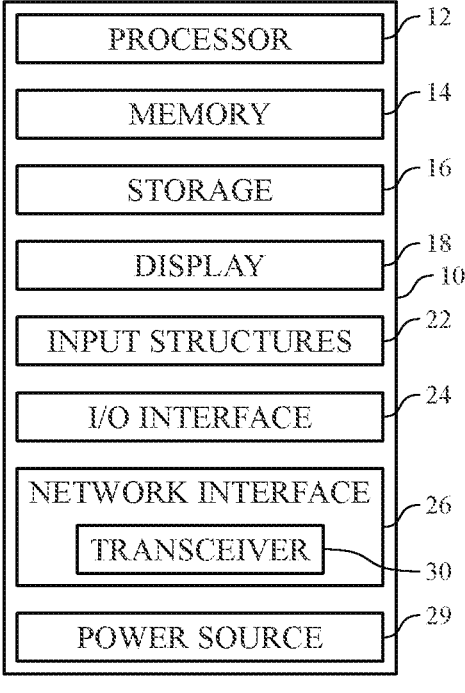
FIG. 1 is a block diagram of user equipment, according to embodiments of the present disclosure.
FIG. 2 is a functional diagram of the user equipment of FIG. 1, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to maintaining wireless communication service to user equipment by implementing mobility procedures. As discussed above, the user equipment (e.g., a mobile communication device) may join a wireless communication network by communicatively coupling or connecting to a base station. In high frequency (e.g., mmWave, sub-THz) networks, coverage may be limited to certain areas. During mobility scenarios, the user equipment may enter or leave coverage supported by different base stations resulting in transitioning (e.g., handover) from a currently connected base station to a target base station. In an embodiment, the user equipment may connect to a cell cluster made up of multiple cells supported by multiple base stations. For example, the cell cluster may include a primary cell supported by a primary base station and additional (e.g., secondary) cells supported by additional (e.g., secondary) base stations. The user equipment may maintain (e.g., monitor) a link with each base station of the cell cluster, while transmitting or receiving user data to or from the primary base station. However, as the user equipment moves within the cell cluster, a signal characteristic (e.g., at the receiver) of the user equipment may fall below a threshold value. The user equipment may request a handover from the primary base station to another (e.g., better performing, target) base station within the cell cluster. Additionally or alternatively, base stations may be added or removed from the cell cluster (e.g., by a cloud server, a primary base station) as the user equipment moves. In this way, the user equipment may transition (e.g., seamlessly transition) between base stations of the cell cluster, thereby maintaining wireless network service, while reducing or eliminating interruptions to the wireless network service.

In an embodiment, the user equipment may implement mobility procedures to save power and trigger transitions (e.g., seamless transitions). In particular, the wireless network may generate a map indicative of locations of the base stations, beam directions of the base stations, and coverage areas of the beams for the user equipment. As the user equipment moves (e.g., along a busy street), it may determine a predicted route. The user equipment may also determine or receive indication of one or more obstructions or blockages (e.g., moving objects, static objects) along the predicted route. Based on the predicted route and the map, the user equipment may determine base stations along its route and predict handovers, thereby implementing mobility procedures. Furthermore, the user equipment may save power by reducing search procedures by utilizing the locations of the base stations within the map (e.g., as opposed to dynamically determining the base stations in real-time).

In additional or alternative embodiments, the user equipment may utilize mobility procedures to mitigate line of sight blockages. That is, a signal (e.g., downlink) from the base station may travel in a direct path (e.g., line of sight) to the user equipment, and vice versa (e.g., in the case of an uplink signal). As such, a signal characteristic (e.g., strength or quality) may depend on the line of sight between the user equipment and the base station. When the line of sight is blocked, the signal characteristic may decrease (e.g., to a point where data of a received signal may not be of a sufficient level to be processed). For example, the blockage may include a moving object (e.g., a moving vehicle) or a static object (e.g., a tree) interfering with the connection. In the case of moving objects, the blockage duration may be dependent on a velocity and a size of the object; while in the case of static objects, the blockage duration may be dependent on the velocity of the user equipment and the size of the object. In certain instances, the user equipment may receive indication of blockage information from other user equipment, the wireless network, or the moving object itself. Then, the user equipment may perform mobility procedures before the connection suffers from the blockage.

For example, the user equipment may receive indication of the blockage and request a handover to another base station (e.g., a better performing base station, a target base station) not affected or affected less by the blockage. In another example, the user equipment may utilize reflective intelligent surfaces (RIS's) to relay network connection elements and maintain connection during the blockage. Still in another example, it may be beneficial to briefly suspend connection for a predetermined duration of time (e.g., that may be based on the blockage) and resume operation afterwards. Performing mitigation procedures before the blockage occurs may help to maintain wireless service and reduce or eliminate signal degradation and/or wireless service interruptions (e.g., due to a broken connection).

With the foregoing in mind, FIG. 1 is a block diagram of user equipment 10 (e.g., an electronic device, a wireless communication device, a mobile communication device, and so on), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the mmWave frequency range (e.g., 24.25-300 gigahertz (GHz) or sub-THz) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals (e.g., user data) via one or more antennas, and thus may include a transmitter and a receiver. The power source 29 of the user equipment 10 may include any suitable source of power, such as a rechargeable lithium polymer (Li-poly) battery and/or an alternating current (AC) power converter.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figures 3, 4:
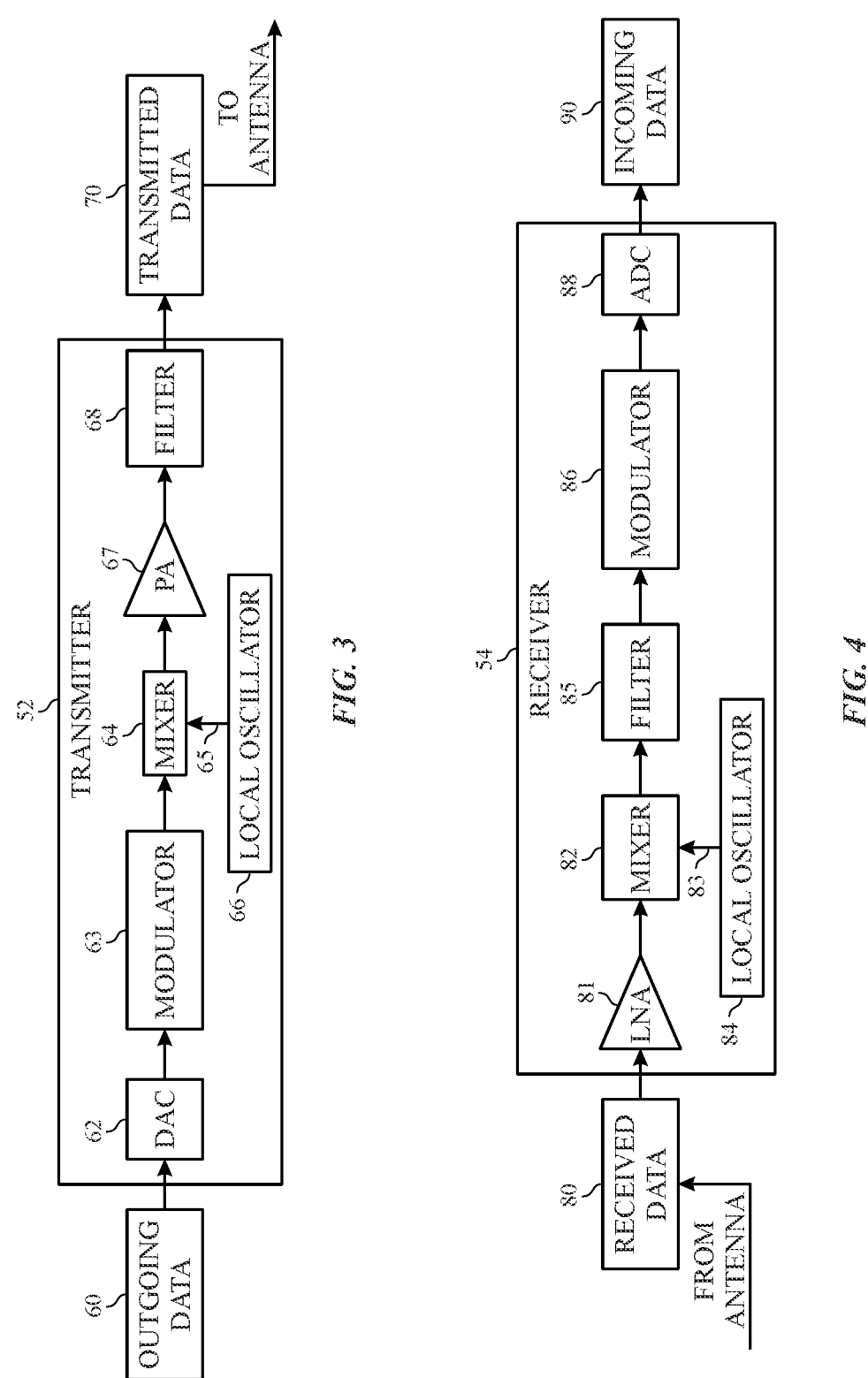
FIG. 3 is a schematic diagram of a transmitter of the user equipment of FIG. 1, according to embodiments of the present disclosure.
FIG. 4 is a schematic diagram of a receiver of the user equipment of FIG. 1, according to embodiments of the present disclosure.

As mentioned above, the transceiver 30 of the user equipment 10 may include a transmitter and a receiver that are coupled to at least one antenna to enable the user equipment 10 to transmit and receive wireless signals (e.g., user data). FIG. 3 is a block diagram of a transmitter 52 (e.g., transmit circuitry) that may be part of the transceiver 30, according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 63 may combine the converted analog signal with a carrier signal. A mixer 64 may combine the carrier signal with a local oscillator signal 65 (which may include quadrature component signals) from a local oscillator 66 to generate a radio frequency signal. A power amplifier (PA) 67 receives the radio frequency signal from the mixer 64, and may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include an additional mixer and/or a digital up converter (e.g., for converting an input signal from a baseband frequency to an intermediate frequency). As another example, the transmitter 52 may not include the filter 68 if the power amplifier 67 outputs the amplified signal in or approximately in a desired frequency range (such that filtering of the amplified signal may be unnecessary).

FIG. 4 is a schematic diagram of a receiver 54 (e.g., receive circuitry) that may be part of the transceiver 30, according to embodiments of the present disclosure. As illustrated, the receiver 54 may receive received data 80 from the one or more antennas 55 in the form of an analog signal. A low noise amplifier (LNA) 81 may amplify the received analog signal to a suitable level for the receiver 54 to process. A mixer 82 may combine the amplified signal with a local oscillator signal 83 (which may include quadrature component signals) from a local oscillator 84 to generate an intermediate or baseband frequency signal. A filter 85 (e.g., filter circuitry and/or software) may remove undesired noise from the signal, such as cross-channel interference. The filter 85 may also remove additional signals received by the one or more antennas 55 that are at frequencies other than the desired signal. The filter 85 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54 may include any suitable additional components not shown, or may not include certain of the illustrated components, such that the receiver 54 may receive the received data 80 via the one or more antennas 55. For example, the receiver 54 may include an additional mixer and/or a digital down converter (e.g., for converting an input signal from an intermediate frequency to a baseband frequency).

Figure 5:
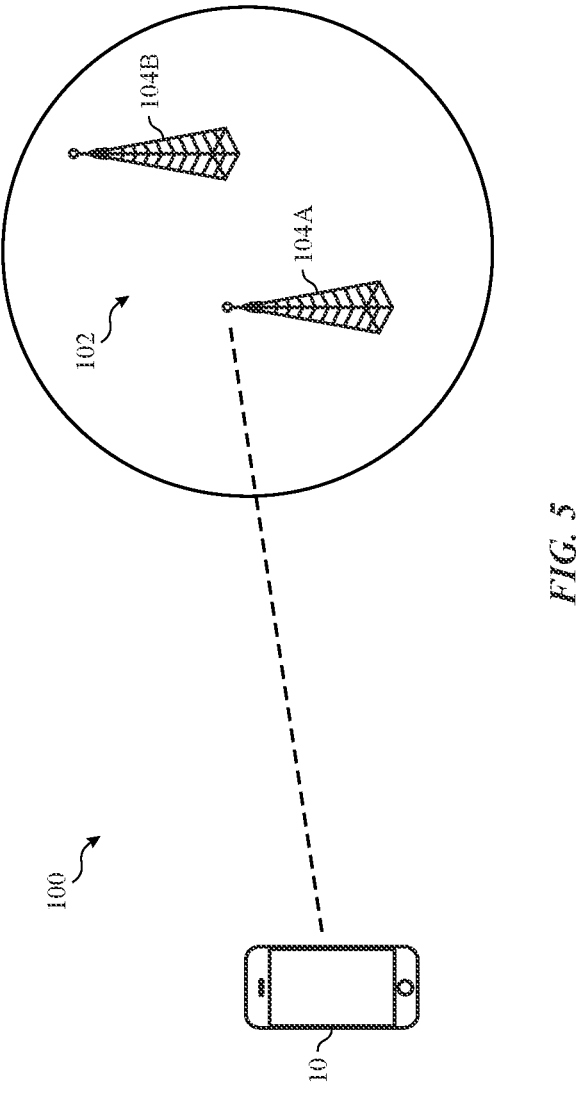
FIG. 5 is a schematic diagram of a communication system including the user equipment of FIG. 1 communicatively coupled to a wireless communication network supported by base stations, according to embodiments of the present disclosure.

FIG. 5 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, the receiver 54, and the associated circuitry shown in FIG. 4. It should be understood that while the present disclosure may use 5G/NR as an example specification or standard, the embodiments disclosed herein may apply to other suitable specifications or standards (e.g., such as the 4G/LTE specification, sixth generation (6G), beyond 6G, and so on). Moreover, the network 102 may include any suitable number of user equipment(s) 10 (e.g., one or more user equipment 10, four or more user equipment 10, ten or more user equipment 10, and so on) and/or base stations 104 (e.g., one or more base stations 104, four or more base stations 104, ten or more base stations 104, and so on).

To connect to a first base station 104A, the user equipment 10 may scan to detect base stations 104 of the wireless network 102. In particular, the user equipment 10 may detect the first base station 104A by receiving a radio frequency (RF) signal when the user equipment 10 enters a coverage area of the base station 104A (e.g., a geographical region for which the base station 104 provides network coverage). The user equipment 10 may synchronize to the first base station 104A by aligning its signal with the RF signal of the first base station 104A. Further, the first base station 104A may broadcast or transmit system information (e.g., downlink data) indicative of frequency bands supported by the base station 104A. The system information may also include timing specification, power specifications, Global Positioning System (GPS) or Global Navigation Satellite System (GNSS) coordinates, and/or other suitable information to enable the user equipment to establish the connection with the base station 104A. The user equipment 10 may receive the system information and to establish a communication link (e.g., connection) with the base station 104A and the wireless network 102. For example, user data may be sent over a channel of the communication link that is allocated to the user equipment 10 by the base station 104 and/or the wireless network 102. Moreover, the user equipment 10 may monitor to the communication link for signal characteristics, such as a signal strength, a signal quality, or the like. In other words, the base station 104 may transmit or receive user data to or from the user equipment 10 over the channel allocated to the user equipment 10 or the established communication link Additionally or alternatively, the user equipment 10 may transmit indication of its capabilities (e.g., uplink data) to the base station 104.

However, in certain instances, the user equipment 10 may move locations (e.g., relative to the base station 104) or an object may interfere with the connection, referred to herein as a "mobility scenario." For example, movement of the user equipment 10 may cause the user equipment to leave the coverage area of the first base station 104A, thereby degrading the connection. The user equipment 10 may perform power-consuming search procedures to determine a target base station (e.g., second base station 104B) for connection and send an indication of a request to transition (e.g., handover) to the second base station 104B. The wireless communication network 102 may schedule a transition from the first base station 104A to the second base station 104B. However, control signaling for handovers may cause service interruptions (e.g., signal delays) and user equipment 10 throughput may suffer due to continued and impaired connection to the first base station 104A. Additionally or alternatively, a moving object may block the connection between the user equipment 10 and the first base station 104A, thereby causing service interruptions. As such, it may be beneficial for the user equipment 10 to implement one or more mobility procedure(s) to reduce or eliminate interruptions to wireless network service.

The devices and/or user equipment disclosed herein may include the user equipment 10 as described above. Additionally, the cells and/or network nodes disclosed herein may include the base stations 104 as described above. Further, the network disclosed herein may include the wireless communication network 102.

Figure 6A:
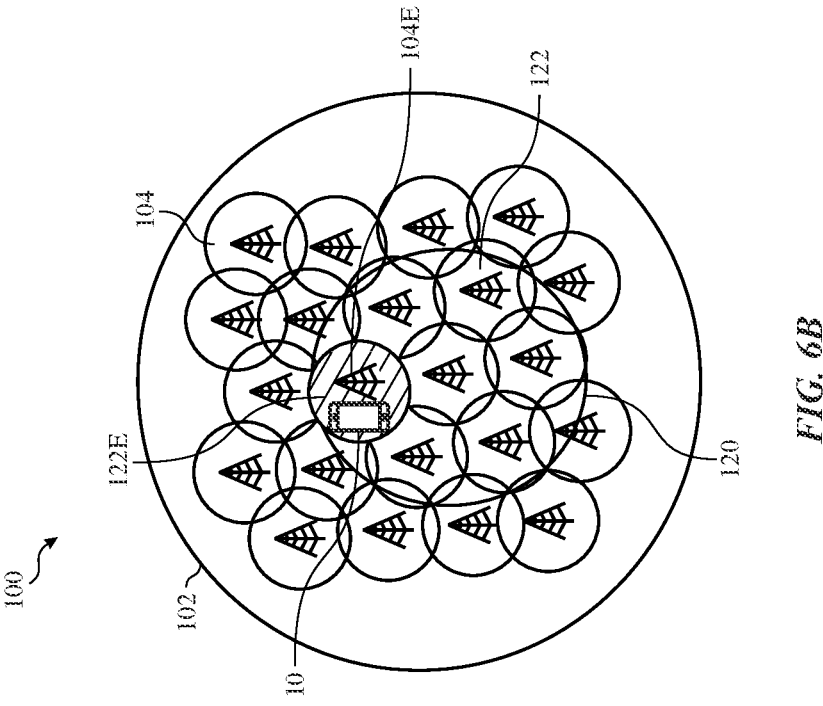
FIG. 6A is a schematic diagram of the communication system including the user equipment of FIG. 1 communicatively coupled to the wireless communication network supported by a cell cluster, according to embodiments of the present disclosure.

With the foregoing in mind, FIG. 6A is a schematic diagram of the communication system 100 including the user equipment 10 of FIG. 1 communicatively coupled to the wireless communication network 102 supported by a cell cluster 120, according to embodiments of the present disclosure. In particular, the cell cluster 120 may include one or more cells 122 (e.g., supported by base stations 104), including a primary cell 122a (e.g., supported by base station 104a). Each cell 122 is supported by a respective base station 104. For example, the base station 104 may have antennas 55 configured in an omnidirectional configuration and provide coverage to an area for wireless service. In other words, the cell 122 may be the coverage area provided by the base station 104. For example, the user equipment 10 may enter the cell 122 of the base station 104, communicatively couple to the base station 104, and receive wireless service. In mobility scenarios, the user equipment 10 may also leave the cell 122 and a signal characteristic may fall below a threshold value causing wireless service to degrade. As such, the user equipment 10 may request a handover.

In the illustrated example, the cell cluster 120 includes seven cells 122 (e.g., supported by seven respective base stations 104); one cell 122 of the cell cluster 120 may act as the primary cell 122a (e.g., supported by a primary base station 104*a*) and provide coverage to the user equipment 10. However, the cell cluster 120 may include any suitable number of cells 122 (e.g., two cells 122, four cells 122, ten cells 122, and so on) that are supported by any suitable number of base stations 104.

The user equipment 10 may communicatively couple or connect to each base station 104 of the cell cluster 120, but only transmit or receive user data using the primary base station 104*a*. For example, user equipment 10 may establish a link (e.g., open a channel) with each base station 104 of the cell cluster 120. The user equipment 10 may monitor link conditions to determine a signal characteristic of each base station 104. The signal characteristic may include a signal quality (e.g., Reference Signal Received Quality (RSRQ), signal-to-noise ratio (SNR), signal-to-interference & noise ratio (SINR)), a signal strength (e.g., Reference Signal Received Power (RSRP)), a power signal, a signal delivery, or the like. For example, a link of a first base station 104*b* may an acceptable signal quality (e.g., above a threshold) due to close proximity between the first base station 104*b* and the user equipment 10. In another example, a blockage between a second base station 104*c* and the user equipment 10 may result in poor signal strength (e.g., below a threshold). By monitoring the link of each base station 104, the user equipment 10 may determine a better performing base station 104 based on the signal characteristic(s).

The primary base station 104*a* may be a better performing base station 104 of the cell cluster 120. For example, the primary base station 104*a* may be in a center of the cell cluster 120 with the strongest signal strength (relative to the base stations 104 of the cell cluster 120). Further, the signal quality of the primary base station 104*a* may be greater than the signal quality of the first cell 122*b*, which may cause the user equipment 10 to connect to the primary base station 104*a* over the first base station 104*b*.

In another example, the user equipment 10 may enter the primary cell 122*a* and connect to the primary base station 104*a* to transmit or receive user data. The user data may include data specific to operations requested or initiated by a user executing software applications on the user equipment 10, such as for transmitting or receiving messages (e.g., electronic mail, Short Message Service (SMS) text message, streaming, gaming, chatting, video conferencing, or the like). For example, downlink and uplink user data may be transferred using the primary base station 104*a*. However, in certain instances, the signal characteristics of the primary base station 104*a* may decrease below a threshold value. For example, during mobility scenarios, the user equipment 10 may move in a direction of travel 126 and out of the primary cell 122*a*, thereby causing the signal characteristic to decrease below the threshold value. In another example, connection with the primary base station 104*a* may fail (e.g., due to a lack of signal strength, connection failure, power failure) causing the signal characteristic (e.g., at the receiver 54) of the user equipment 10 to fall below the threshold value. Still in another example, an object may block a line of sight, and thus the connection, between the user equipment 10 and the primary base station 104*a*. As such, the user equipment 10 may utilize mobility procedures to switch between base stations 104 of the cell cluster 120 to maintain wireless service.

In certain instances, the user equipment 10 may request to switch beams (e.g., generated by multiple antennas) of the primary base station 104*a* supporting the primary cell 122*a* to maintain connection. In other instances, the user equipment 10 may request a transition from the primary base station 104*a* to a target base station 104*d*. The target base station 104*d* may be a better performing base station 104 with better signal characteristics compared to the current primary base station 104*a* or an additional base station 104 of the cell cluster 120 that may start providing coverage to the user equipment 10. In the illustrated example, the user equipment 10 may travel in the direction of travel 126 and leave the primary cell 122*a*, thereby causing signal characteristics to decrease. The user equipment 10 may enter an adjacent cell 122*d* supported by the target base station 104*d*, which is an adjacent base station 104 in the direction of travel 126. As such, the user equipment 10 may request to transition from the primary base station 104*a* to the target base station 104*d*.

To transition (e.g., seamlessly transition) between the primary base station 104*a* to the target base station 104*d*, the user equipment 10 may use lower layer (e.g., Layer 2, physical layer, Media Access Control (MAC) layer, and so on) signaling to avoid slower higher layer (e.g., Radio Resource Control (RRC) layer) signaling procedures. In some embodiments, while the user equipment 10 monitors the primary base station 104*a* to receive downlink scheduling information, an uplink channel may allow the user equipment 10 to start monitoring the downlink control channel of the target base station 104*d*. The wireless network 102 may schedule a transition for the user equipment 10 connect to the target base station 104*d*, enabling a seamless transition from the primary base station 104*a* to the target base station 104*d*. Since the user equipment 10 maintains links with each base station 104 of the cell cluster 120, the wireless network 102 may transition the data link to the target base station 104*d* by scheduling the user equipment 10 to use the target base station 104*d*. Once the user equipment 10 detects scheduling on the target base station 104*d*, the transition (e.g., handover) is completed and the user equipment 10 may stop monitoring the downlink control channel of the primary base station 104*a*. In other words, the user equipment 10 may transmit and receive user data using the target base station 104*d*.

Figure 6B:
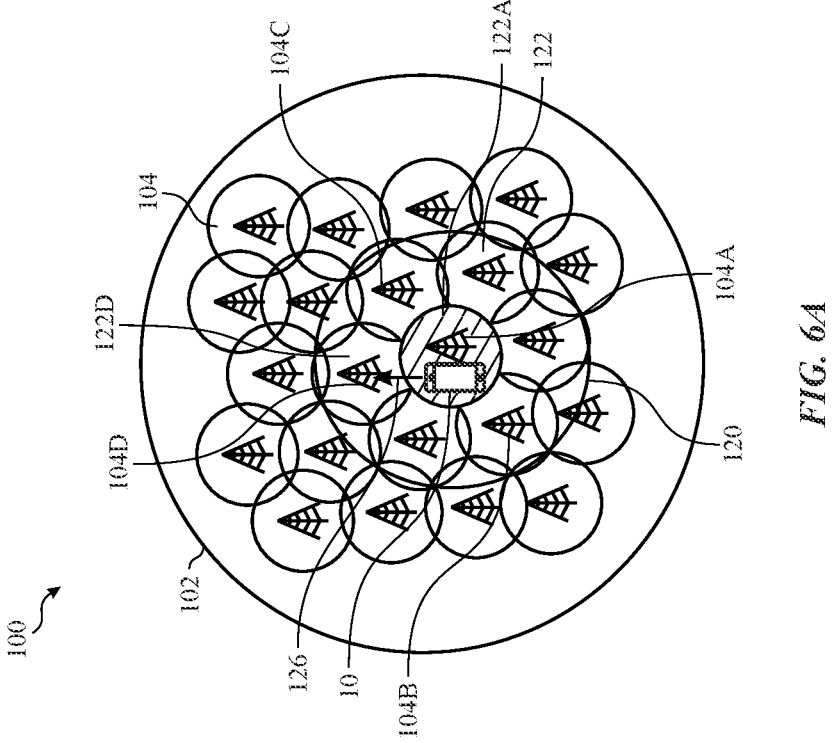
FIG. 6B is a schematic diagram of the communication system including the user equipment of FIG. 1 communicatively coupled to the wireless communication network supported by the cell cluster 120, according to embodiments of the present disclosure.

FIG. 6B is a schematic diagram of the communication system 100 including the user equipment 10 of FIG. 1 communicatively coupled to the wireless communication network 102 supported by the cell cluster 120, according to embodiments of the present disclosure. During mobility scenarios, the user equipment 10 may enter and leave cells 122 of the cell cluster 120. In certain instances, the cell 122 in which the user equipment 10 is located may be the primary cell 122*a* providing coverage to the user equipment 10.

As described with respect to FIG. 6A, the user equipment 10 may be located in the primary cell 122*a*, move in the direction of travel 126, and enter the target cell 122*d*. The user equipment 10 may request transition from the primary base station 104*a* (supporting the primary cell 122*a*) to the target base station 104*d* (supporting the target cell 122*d*). Following the transition, the target cell 122*d* may become the new primary cell 122*e* (supported by the new primary base station 104*e*) and the old primary base station 104*a* may act as a base station 104 of the cell cluster 120, as illustrated in FIG. 6B. That is, the user equipment 10 may transmit and receive user data using the new primary base station 104*e* and monitor the link of the old primary base station 104*a*.

Figure 7:
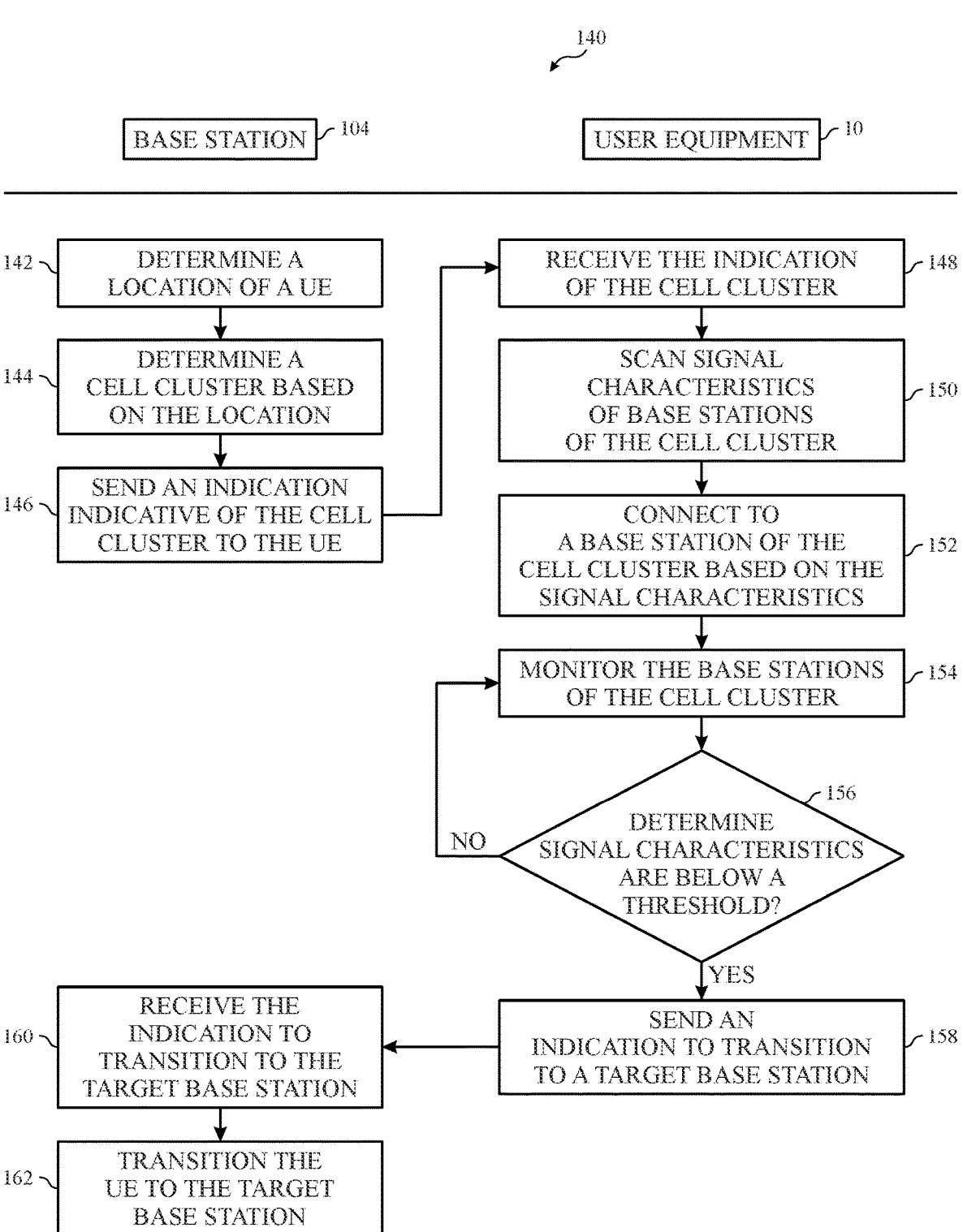
FIG. 7 is a flowchart of a method for enabling the user equipment of FIG. 1 to transition between base stations of the cell cluster of FIG. 6, according to embodiments of the present disclosure.

FIG. 7 is a flowchart of a method 140 for enabling the user equipment 10 of FIG. 1 to transition between base stations 104 of the cell cluster 120, according to embodiments of the present disclosure. Any suitable device (e.g., a controller) that may control components of the user equipment 10, the network 102, and/or the base station 104, such as the processor 12, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating system of the user equipment 10, the network 74, and/or the base station 104, one or more software applications of the user equipment 10, the network 102, and/or the base station 104, and the like. While the method 140 is described using steps in a specific sequence, it should be understood that the present disclosure contemplates that the described steps may be performed in different sequences than the sequence illustrated, and certain described steps may be skipped or not performed altogether.

In process block 142, the base station 104 determines a location of the user equipment 10. For example, the base station 104 may receive an indication of the location of the user equipment 10 from uplink user data sent by the user equipment 10. In another example, the wireless network 102 may determine the location of the user equipment 10 based on the location of the connected base station 104. Additionally or alternatively, the user equipment 10 may determine its location and send an indication of the location (e.g., GPS coordinates or GNSS coordinates) to the base station 104.

In process block 144, the base station 104 determines a cell cluster 120 based on the location of the user equipment 10. The cell cluster 120 may be maintained by a central unit, a primary cell 122*a*, a cloud server, or the like. The wireless network 102 may have network information indicative of one or more base stations 104, a location of the base stations 104, a beam characteristic of the base stations 104, or other information for determining the cell cluster 120. For example, the wireless network 102 may determine one or more base stations 104 within a threshold area of the user equipment 10 to form the cell cluster 120. In a region with fewer base stations 104, the size (e.g., area covered) by the cell cluster 120 may be greater than the size of the cell cluster 120 formed in a region densely populated by base stations 104. In another example, the wireless network 102 may determine a threshold number of base stations 104 for the cell cluster 120.

In process block 146, the base station 104 sends an indication indicative of the cell cluster 120 to the user equipment 10. The base station 104 may transmit an indication of the cell cluster 120 as downlink data. The indication may include a number of base stations 104, the locations of the base stations 104 (e.g., GPS coordinates or GNSS coordinates), downlink data of each base station 104, or the like. Further, as described with respect to FIGS. 8A and 8B, the base stations 104 may be added or removed from the cell cluster 120 during mobility scenarios. As such, the base station 104 may periodically send the indication of the cell cluster 120 to the user equipment 10.

In process block 148, the user equipment 10 receives the indication of the cell cluster 120. Upon receiving the indication, the user equipment 10 may scan the cell cluster 120 in process block 150 to prepare for future transitions. That is, the user equipment 10 may establish a link with each base station 104 of the cell cluster 120 to determine signal characteristics of each base station 104. For example, the user equipment 10 may monitor the links to the cells 122 to determine a signal strength, a signal quality, a power signal, and/or a signal delivery. Based on the signal characteristics of each cell 122, the cell cluster 120 may determine a better performing base station 104 of the cell cluster 120. The user equipment 10 may select one or more signal characteristics for determining the better performing base station 104. For example, the user equipment 10 may monitor signal strength and signal quality to determine the better performing base station 104. In an embodiment, the user equipment 10 may apply a weighting system by assigning weights to each signal characteristic and determine the better performing base station 104 based on the weights applied to the corresponding signal characteristic.

In process block 152, the user equipment 10 connects to a base station 104 of the cell cluster 120 based on the signal characteristics. In some embodiments, the user equipment 10 may connect to a better performing base station 104 based on the signal characteristics. The connected cell may be used as the primary cell 122*a*. The user equipment 10 may transmit or receive user data using the primary base station 104*a*, while monitoring the links with the base stations 104 of the cell cluster 120. In certain embodiments, the user equipment 10 may center a cell 122 of the cell cluster 120 and connect to the base station 104 supporting the cell 122.

In process block 154, the user equipment 10 monitors the base stations 104 of the cell cluster 120. For example, the user equipment 10 may determine or receive the signal strength, the signal quality, the power signal, and/or the signal delivery of each link to each base station 104 in preparation for a possible transition. In another example, the user equipment 10 may monitor the channel conditions of each base station 104 of the cell cluster.

In decision block 156, the user equipment 10 may determine if signal characteristics of the primary base station 104*a* are below a threshold. For example, the user equipment 10 may periodically determine if the signal characteristics (e.g., strength or quality) of the primary base station 104*a* decrease below the threshold. In certain instances, the user equipment 10 may move out of the primary cell 122*a* causing signal characteristics to decrease. In other instances, a blockage may occur causing signal characteristics from the primary base station 104*a* to decrease.

However, in certain instances, the signal characteristics may not decrease below the threshold. If the signal characteristics are not below the threshold, then the method may return to process block 154 and the user equipment 10 continues to monitor the cells 122 of the cell cluster 120.

If signal characteristics are below the threshold, then in process block 158, the user equipment 10 sends an indication to transition to a target base station 104*d*. Since the user equipment 10 maintains links with each base station 104 of the cell cluster 120, the user equipment 10 may immediately determine a better performing base station 104*d* based on the signal characteristics. That is, the user equipment 10 may determine the better performing base station 104 to be the target base station 104*d*. For example, the better performing base station 104*d* may have a stronger or strongest signal quality compared to other base stations 104 within the cell cluster 120. As such, the user equipment 10 may determine the target base station 104*d* for transitioning. The user equipment 10 may request scheduling to the target base station 104*d* in response to determining the target base station 104*d*. In certain instances, the user equipment 10 may start transmitting or receiving user data to or from the target base station 104*d* instead of waiting for a command signal from the base station 104 for the transition.

At process block 160, the base station 104 receives the indication to transition to the target base station 104*d*. The user equipment 10 may request scheduling through a lower layer to avoid signal delays in the upper layers and the base station 104 may receive the request through the lower layer. In process block 162, the base station 104 transitions the user equipment 10 to the target base station 104*d*. That is, the wireless communication network 102 may start transmitting or receiving data to or from the user equipment 10 through the target base station 104*d*. Once the user equipment 10 detects transitioning on the target base station 104*d*, the transition (e.g., handover) is completed and the user equipment 10 may stop monitoring the downlink control channel of the primary base station 104*a*. In other words, the user equipment 10 may immediately transmit and receive user data using the target base station 104*d*. In this way, the user equipment 10 may not wait for command signaling from the wireless communication network 102, and, instead, the user equipment 10 may start using the target base station 104*d* in response to determining signal characteristics decreasing below the threshold (e.g., from decision block 156). As such, the method 140 may enable the user equipment 10 to maintain wireless communication service while decreasing or eliminating interruptions to the wireless communication service during handovers.

Figure 8A:
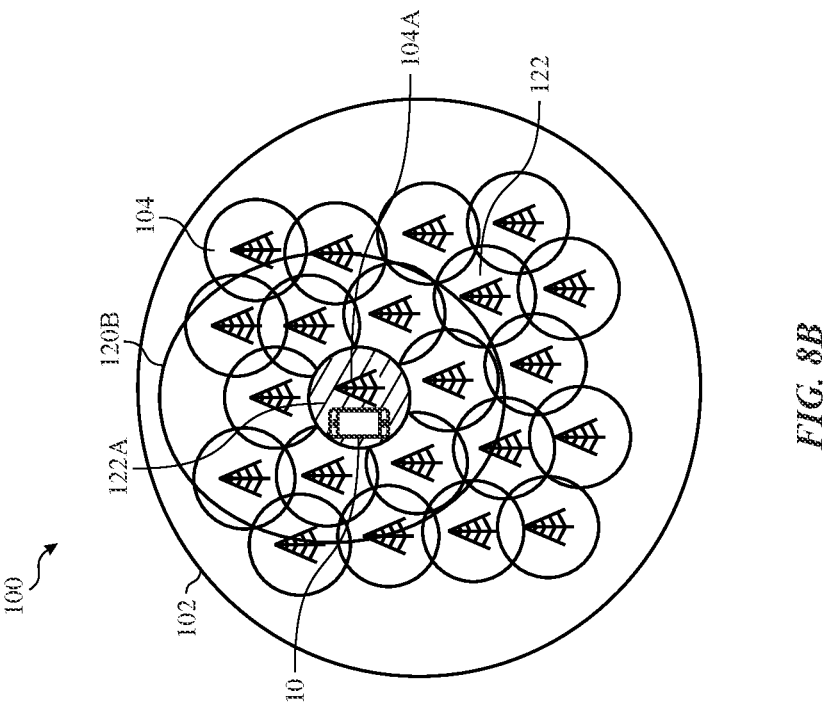
FIG. 8A is a schematic diagram of the user equipment of FIG. 1 communicatively coupled to the wireless communication network supported by a first cell cluster, according to embodiments of the present disclosure.

FIG. 8A is a schematic diagram of the user equipment 10 of FIG. 1 communicatively coupled to the wireless communication network 102 supported by a first cell cluster 120A, according to embodiments of the present disclosure. The cell cluster 120 may be maintained (cloud server, primary cell, central unit of the wireless network 102) based on the location of the user equipment 10. Maintaining the cell cluster 120 may require the user equipment 10 to exchange information (e.g., downlink or uplink data) with the wireless network 102. For example, the wireless network 102 may receive an indication of the location of the user equipment 10 and create the cell cluster 120 based on a number of base stations 104 surrounding the location of the user equipment 10. That is, the wireless network 102 and/or the base station 104 may determine a number of base stations 104 surrounding the location of the user equipment 10. A smaller cell cluster 120 may be formed by combining base stations 104 within a smaller (e.g., 50 meter, 100 meter, and so on) radius from the location of the user equipment 10, while a larger cell cluster 120 may include base stations 104 within a larger (e.g., 1 kilometer, multiple kilometers, and so on) radius from the location of the user equipment 10. In another example, the smaller cell cluster 120 may be formed in an area with high base station density, such as a city, a downtown area. A larger cell cluster 120 may be formed in an area with low base station density, such as a rural region. In certain instances, the wireless network 102 may determine a number of base stations 104 within a pre-determined radius of where the user equipment 10 is located. If the number of base stations 104 is greater than a threshold value, then the wireless network 102 may generate the smaller cell cluster 120 (e.g., of an area having a radius smaller than the pre-determined radius). If the number of base stations 104 is smaller than the threshold value, then the wireless network 102 may generate the larger cell cluster 120 (e.g., of an area having a radius larger than the pre-determined radius). Additionally or alternatively, the wireless network 102 may form the cell cluster 120 based on a frequency (e.g., mmWave, GHz, sub-THz) used for connection. Additionally or alternatively, the wireless network 102 may determine a mobility type (e.g., driving, walking) of the user equipment 10 to determine the cell cluster size. For example, for a first mobility type (e.g., walking), the smaller cell cluster 120 may be formed since a period of time to travel a certain distance (e.g., 50 meters) may be greater than for a second mobility type (e.g., driving). In such an example, the larger cell cluster 120 may be formed for the second mobility type, since frequent transitions (e.g., handovers) may be needed to maintain wireless service. To facilitate such transitions, each base station 104 of the cell cluster 120 may apply a standardized configuration with minimal base station specific parameters (e.g., same DCI).

Figure 8B:
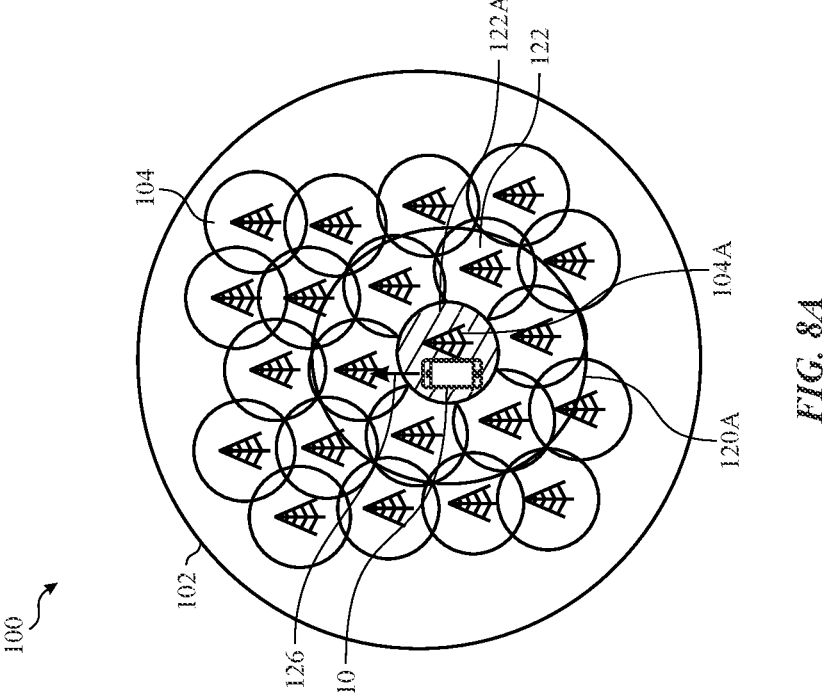
FIG. 8B is a schematic diagram of the user equipment of FIG. 1 communicatively coupled to the wireless communication network supported by a second cell cluster, according to embodiments of the present disclosure.

In the illustrated example, the first cell cluster 120A may include seven cells 122 (supported by seven base stations 104). The user equipment 10 may be located in a primary cell 122*a* (supported by a primary base station 104*a*). However, the user equipment 10 may move in the direction of travel 126, causing the user equipment 10 to leave the primary cell 122*a* and enter an adjacent cell 122*d* (supported by the target base station 104*d*). As described with respect to FIGS. 6A, 6B, and 7, the user equipment 10 may send an indication of a request to transition to the target base station 104*d* and the base station 104 may receive the indication of the request and schedule the user equipment 10 to the target base station 104*d*. As the user equipment 10 moves within the first cell cluster 120A, base stations 104 may be added to or removed to form a second cell cluster 120B, further described with respect to FIG. 8B. For example, the wireless network 102 may add in the direction of travel 126 or remove base stations 104 from the cell cluster 120, such that the cell cluster 120 moves with the user equipment 10 during mobility scenarios. With the foregoing in mind, FIG. 8B is a schematic diagram of the user equipment 10 of FIG. 1 communicatively coupled to the wireless communication network 102 supported by a second cell cluster 120B, according to embodiments of the present disclosure. In certain embodiments, following the transition from the primary base station 104*a* to the target base station 104*d*, the wireless network 102 may add or remove base stations 104 from the cell cluster 120 such that the user equipment 10 remains within the cell cluster 120 during mobility scenarios. The second cell cluster 120B may include nine cells 122. The location of the second cell cluster 120B may be shifted in the direction of travel 126 (e.g. direction of movement of the user equipment 10) relative to the first cell cluster 120A described with respect to FIG. 8A. For example, the wireless network 102 may expand the first cell cluster 120A by adding neighboring (e.g., surrounding) base stations 104 adjacent the new primary cell 122*a* (previously the target cell 122*d*) in the direction of travel 126. In this way, the user equipment 10 may remain within the cell cluster 120 when moving in the direction of travel 126. In the illustrated example, the second cell cluster 120B includes five new cells 122 (supported by five new base stations 104) in the direction of travel 126. The wireless network 102 may send an indication of the new base stations 104 and the user equipment 10 may begin monitoring a link in preparation of potential transitions.

Additionally or alternatively, the wireless network 102 may remove one or more base stations 104 in response to the transition. For example, three cells 122 opposite the direction of travel 126 may be removed from the second cell cluster. To remove base stations 104 from the cell cluster 120 (e.g., first cell cluster 120A or second cell cluster 120B), the wireless network 102 may send indication of to stop monitoring the links of the removed base stations 104 to the user equipment 10 and the user equipment 10 may stop monitoring the link of the removed cells 122. While the illustrated example adds more base stations 104 to the cell cluster 120, in certain instances, the wireless network 102 may remove one or more current base stations 104 from the cell cluster 120 in response to adding one or more new base stations 104 to the cell cluster 120. As such, in some embodiments, a number of base stations 104 of the cell cluster 120 may remain constant. In this manner, overall signal characteristics for the user equipment 10 may improve, signal delay may be decreased, and service interruption when transitioning may be decreased.

In high frequency networks, coverage may be limited to certain areas, as such user equipment 10 may perform power-consuming search operations to identify such coverage. Furthermore, during mobility scenarios, frequent transitions may be required to maintain wireless service. As such, the user equipment 10 may frequently perform the power-consuming search operations. For example, the user equipment 10 may move along a busy street with multiple objects (e.g., obstacles). The user equipment 10 may connect to a first base station 104a along a route, but quickly leave the coverage area of the first base station 104a. As such, the user equipment 10 may search for a second base station 104b for coverage and transition. However, the second base station 104b may provide poor signal characteristics or coverage for a limited time, thereby requiring the user equipment 10 to perform another search for a better performing base station 104. In certain instances, the search procedures may be reduced or eliminated by providing the user equipment 10 a map indicating the locations of base stations 104 and coverage information.

Figure 9:
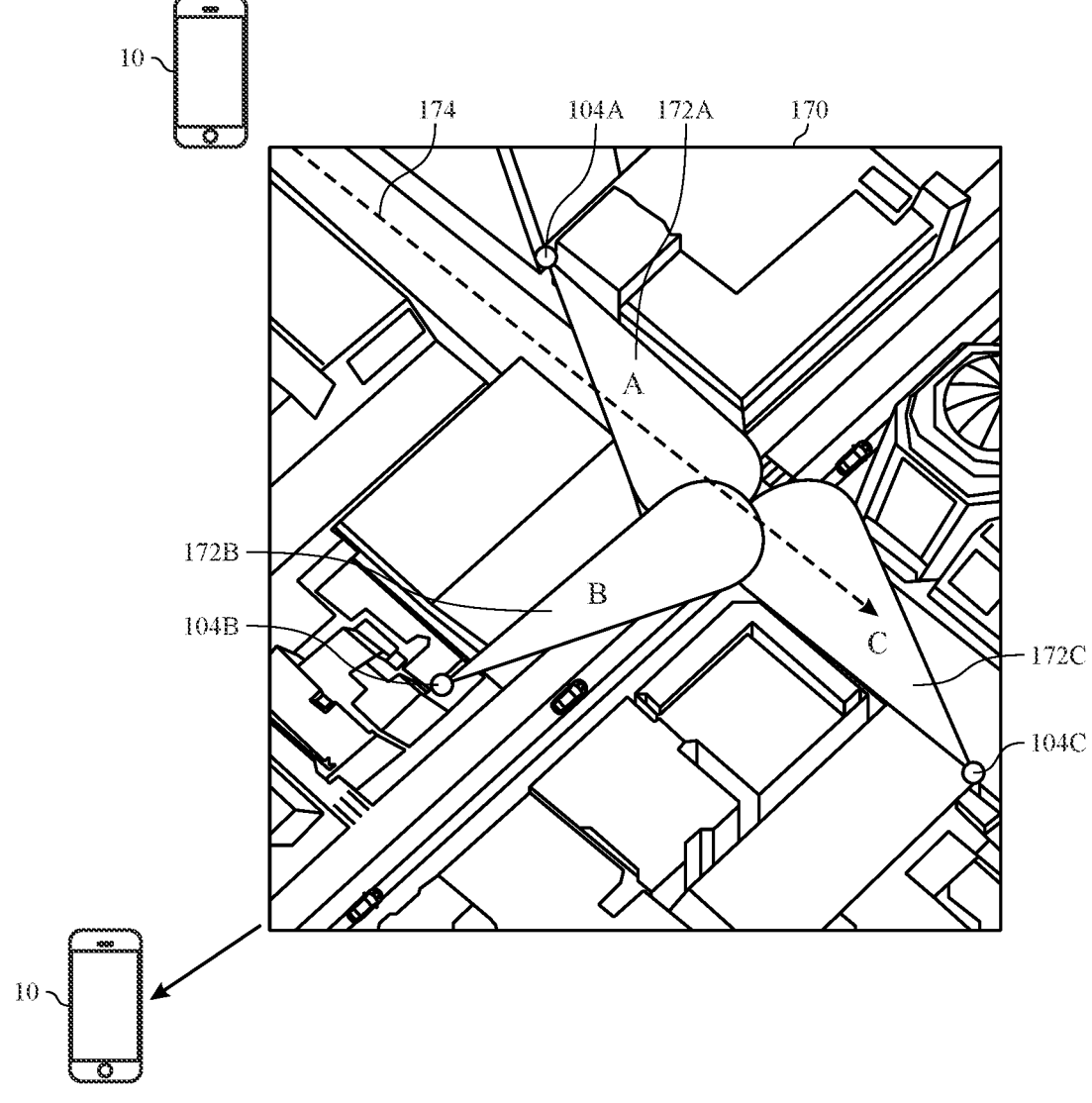
FIG. 9 is a perspective diagram of the user equipment of FIG. 1 utilizing a map indicative of coverage of different base stations, according to embodiments of the present disclosure.

With the foregoing in mind, FIG. 9 is a perspective diagram of the user equipment of FIG. 1 utilizing a map 170 indicative of coverage of different base stations 104, according to embodiments of the present disclosure. In some cases, to determine the base stations 104 of the wireless network 102, the user equipment 10 may perform power-consuming searches. To avoid or decrease the searches, the wireless network 102 may generate a map 170 with locations of base stations 104 and a coverage area (e.g., of a beam 172) of each base station 104. In this way, the user equipment 10 may proactively connect to base stations 104 along a predicted route instead of reactively searching for base stations 104 each time it leaves a coverage area. For example, the user equipment 10 may determine travel in a straight line (e.g., down a street) and predict the route to continue down the line. In another example, the route may be a historical route periodically traveled by the user equipment 10. The user equipment 10 may utilize a time (e.g., day, week, time) and the location (e.g., school, work, home) to predict the route. Still in another example, the user equipment 10 may receive directions on a map software application that generates a route; and, as the user equipment 10 travels along the route, the user equipment 10 may predict the route according to the route generated by the map software application.

In the illustrated example, each base station 104 may emit a beam 172 with multiple antennas that provides network coverage to the user equipment 10. For example, the beam 172 may have a frequency (e.g., radio frequency), be directed in a direction, have a shape, have a size (e.g., width, length, angle), have an elevation, and so on. For example, the beams 172 may include short range beams, long range beams, wide beams, narrow beams, or the like. Further, a beam width may include a horizontal direction and/or a vertical direction and a shape may include cone-shaped, pencil-shaped, triangular, and so on. The beam characteristics may be received, determined, and/or saved by the wireless network 102 during a network planning or implementation stage by operators and vendors. Additionally or alternatively, the wireless network 102 may use sensing operations to detect a location of static obstacles, such as buildings located in the beam direction. In certain embodiments, the wireless network 102 may determine coordinates of coverage provided by a beam 172 based on the network deployment. For example, the wireless network 102 may determine coordinates indicative of a location of a base station 104, a shape of the beam 172, a border of the beam 172, coordinates of borders of the beam 172, and so on. The wireless network 102 may share location coordinates of the coverage (e.g., longitude and latitude coordinates of the coverage of the beam 172).

After the user equipment 10 connects to a first base station 104A, the user equipment 10 may receive the map 170 including a location of base stations 104 and coverage information (e.g., beam characteristics). The user equipment 10 may utilize the map 170 to implement mobility procedures based on its position, a predicted route, and/or movement relative to the base stations 104. For example, if the user equipment 10 leaves a coverage area of a beam, the user equipment 10 may utilize the map 170 and its location to determine subsequent coverage areas of other beams In another example, the user equipment 10 may determine an order and periodicity of search procedures by prioritizing subsequent beams along its route (e.g., able to provide network coverage along the route) over base stations 104 that are not along the route (e.g., unable to provide network coverage along the route, only able to provide brief or limited network coverage along the route). The user equipment 10 may determine signal characteristics of base stations 104 along the route for future use to ensure updated radio resource management (RRM) (e.g., power delivery, handover criteria) and/or channel state information (CSI) measurements (e.g., downlink control channel) for mobility decisions (e.g., handovers) and reduce or eliminate measurements for base stations 104 that may not provide coverage along the route. As such knowing the locations of the base stations 104 may not only allow the user equipment 10 to save power by reducing or eliminating search procedures (e.g., RRM measurements, CSI measurements), but also improve performance due to prioritizing procedures for base stations 104 along the route of the user equipment 10.

For example, the map 170 may include a first base station 104A emitting a first beam 172A, a second base station 104B emitting a second beam 172B, and a third base station 104C emitting a third beam 172C. By way of example, the user equipment 10 may travel along a route 176, which enters and leaves multiple coverage areas. With the map 170, the user equipment 10 may improve mobility procedures by decreasing a number of handovers needed. For example, without usage of the map 170, the user equipment 10 may connect to the first base station 104A, transition to the second base station 104B, and then transition to the third base station 104C to maintain cell coverage. The user equipment 10 may leave the coverage area of the first base station 104A and search for an adjacent base station 104 for coverage. In this way, the user equipment 10 may be reacting to leaving the coverage areas, which may cause service interruptions.

With the map 170, the user equipment 10 may proactively determine base stations 104 along the route 174 for wireless service. In certain embodiments, the user equipment 10 may compare the coverage area of each base station 104 with respect to (e.g., along) the predicted route 174 to a threshold. If the coverage area of the base station 104 is less than the threshold, then the user equipment 10 may not connect and determine different base station 104 along the route 174 for connection. Returning to the map 170, the user equipment 10 may determine that coverage provided by the first base station 104A and the third base station 104C is greater than the threshold, while coverage provided by the second base station 104B is less than the threshold. Indeed, the second base station 104B may provide coverage to a limited area with respect to the predicted route 174 of the user equipment. As such, the user equipment 10 may connect to the first base station 104A and transition to the third base station 104C. In this way, the user equipment 10 may reduce the number of handovers along the predicted route 174.

Furthermore, by providing the user equipment 10 with coverage information, the user equipment 10 may save power by not performing or reducing the number of search procedures, therefore optimizing mobility procedures. Accordingly, the user equipment 10 may proactively determining base stations 104 along the route 174. In other words, instead of dynamically performing handovers and beam switches as the user equipment 10 leaves coverage areas, the user equipment 10 may consider its location and the map 170 to improve mobility procedures.

Figure 10:
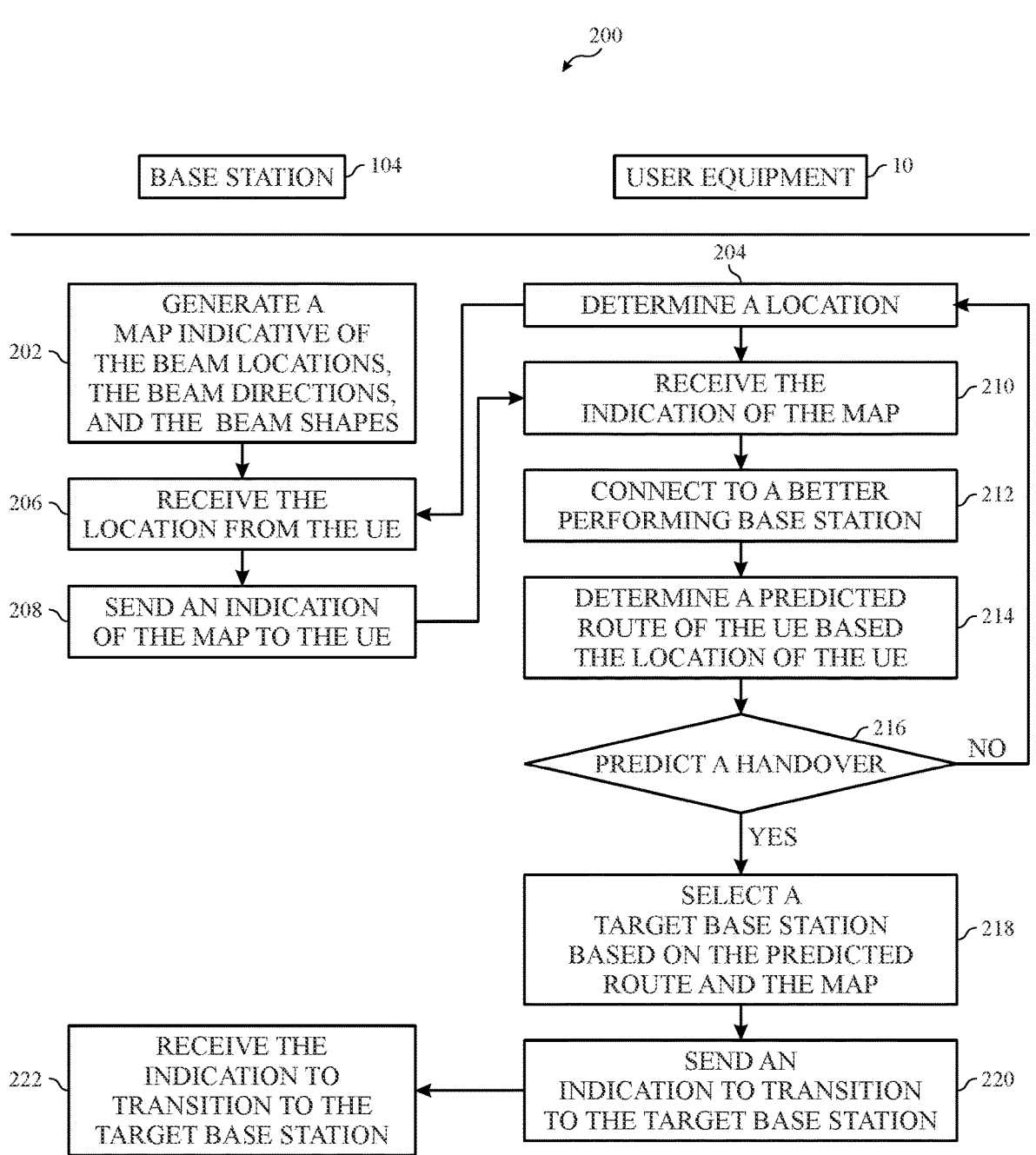
FIG. 10 is a flowchart of a method enabling the user equipment of FIG. 1 to transition between base stations based on the map of FIG. 9 and a predicted route, according to embodiments of the present disclosure.

FIG. 10 is a flowchart of a method 200 enabling the user equipment 10 of FIG. 1 to transition between base stations 104 of the wireless communication network 102 based on the map 170, according to embodiments of the present disclosure. Any suitable device (e.g., a controller) that may control components of the user equipment 10, the network 102, and/or the base station 104, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the user equipment 10, the network 74, and/or the base station 104, one or more software applications of the user equipment 10, the network 102, and/or the base station 104, and the like. While the method 200 is described using steps in a specific sequence, it should be understood that the present disclosure contemplates that the described steps may be performed in different sequences than the sequence illustrated, and certain described steps may be skipped or not performed altogether.

In process block 202, the base station 104 (and/or the network 102) generates a map 170 indicative of one or more base stations 104, beam locations, beam directions, and/or beam shapes of the base station 104 (and/or other base stations 104 of the network 102). For example, the base station 104 (and/or the network 102) may determine coordinates indicate of a location of a base station 104, a shape of the beam 172, a border of the beam 172, coordinates of borders of the beam 172, and so on. For example, during the network planning or implementation stage, one or more operators and/or vendors may determine locations of the base stations 104 and coverage areas. The operators and/or vendors may also determine beam characteristics (e.g., directions, shapes) of each base station 104. Furthermore, the operators and vendors may specify a frequency of the base station 104, a type of the base station 104, or the like. Such network information may be used by the wireless network 102 to generate the map 170. Additionally or alternatively, base stations 104 may be added or removed over time. As such, the map 170 may be periodically updated to include changes in base stations 104.

In process block 204, the user equipment 10 determines a location. For example, the user equipment 10 may determine the location based on GPS coordinates or GNSS coordinates. The user equipment 10 may transmit an indication of the location to the base station 104. In process block 206, the base station 104 receives an indication of the location from the user equipment 10. Additionally or alternatively, the base station 104 may determine the location of the user equipment 10, similar to process block 144 described above with respect to FIG. 7.

In process block 208, the base station 104 sends an indication of the map 170 to the user equipment 10. The base station 104 may send the map 170 as part of the downlink data to the user equipment 10 and the user equipment 10 may utilize the map 170 to determine surrounding base stations 104. In certain instances, the map 170 may cover a large region and certain areas of the map 170 may not be useful to the user equipment 10. For example, the map 170 may include base stations 104 across multiple countries, states, provinces, cities, towns, and so on. To reduce an amount of data transferred, the base station 104 may determine a portion of the map 170 useful to the user equipment 10 based on the location of the user equipment 1-. For example, the base station 104 may determine a threshold radius around the user equipment 10 and send a portion of the map 170 that corresponds to the threshold radius around the user equipment 10.

In process block 210, the user equipment 10 receives the indication of the map 170. For example, the user equipment 10 may download the map 170 and determine the base stations 104 surrounding the user equipment 10. Further, the user equipment 10 may use the map 170 to determine beam characteristics of each base station 104 and determine a better performing base station 104 (e.g., relative to the connected base station 104). As such, in process block 212, the user equipment 10 connects to the better performing base station 104, similar to process block 152 described above with respect to FIG. 7.

In some cases, the user equipment 10 may move in a direction causing the user equipment 10 to leave a coverage area of the connected base station 104 (e.g., the better performing base station 104 described in process block 212). In process block 214, the user equipment 10 determines a predicted route 174 of the user equipment 10 based on a location of the user equipment 10. The predicted route 174 user equipment 10 may be a historical route the user equipment 10 travels along at a same time, same day, from a same location. For example, the user equipment 10 may travel from home to work, or vice versa, at the same time during the weekdays. Based on the location (e.g., home, work) the user equipment 10 may predict travel along the route. In another example, the predicted route 174 may be determined from a map software application. Still in another example, the user equipment 10 may predict multiple routes using GNSS data and the location. The user equipment 10 may be traveling on a road (e.g., highway) and predict multiple routes based on possible switches.

With the map 170, the user equipment 10 determines one or more base stations 104 with coverage along the predicted route 174. For example, the user equipment 10 may determine one or more beams 172 that provides coverage along the predicted route and an area of coverage provided. Further, the user equipment 10 may determine if the coverage is greater than a threshold to minimize handovers during travel. If the coverage is less than the threshold, then the user equipment 10 may not scan the base station 104 to prepare for handovers. Additionally or alternatively, the user equipment 10 may determine one or more base stations 104 with overlapping coverage areas, which may be useful for handovers.

In determination block 216, the user equipment 10 predicts a handover. During mobility scenarios, the user equipment 10 may enter or leave coverage of the base stations 104; as such the user equipment 10 may need to transition between different base stations 104 along the predicted route 174. Based on the predicted route 176 and the map 170, the user equipment 10 may predict leaving or entering coverage, thereby predicting handovers before the handover occurs.

In certain instances, the user equipment 10 determines the handover is not occurring. For example, the user equipment 10 may remain within the coverage of the connected base station 104 while traveling along the predicted route 174. As such, a handover may not be necessary. Then, the method 200 may return to process block 204 to determine the location of the user equipment 10 and process block 214 to determine the predicted route of the user equipment 10 based on the location.

In some instances, the user equipment 10 determines the handover may be needed to maintain wireless service. For example, the user equipment 10 may determine one or more points along the predicted route 174 that leaves the coverage of the connected base station 104, therefore requiring a handover. In process block 218, the user equipment 10 determines a target base station 104 for the handover based on the predicted route and the map 170. For example, the user equipment 10 may determine a target base station 104 providing coverage along the predicted route 174 above the threshold, thereby reducing a number of required handovers during the mobility scenarios. As discussed with respect to FIG. 9, the user equipment 10 may determine that coverage of the first base station 104A and the third base station 104C may be above the threshold, while coverage of the second base station 104B may be below the threshold. As such, the user equipment 10 may skip connecting to the second base station 104 and only predict the handover from the first base station 104A to the third base station 104C. In other words, the user equipment 10 may connect to the first beam 172A, then connect to the third beam 172C, and skip connecting to the second beam 172B. In another example, the user equipment 10 may prioritize scanning a subset of base stations 104 and/or beams 172 closest to the predicted route to determine a target base station 104. In certain instances, the user equipment 10 scans for the subset of target base stations 104 for signal characteristics of for each base station of the subset similar to process block 150 described with respect to FIG. 7. In this way, the user equipment 10 may save power by limiting scanning to the subset of base stations 104 closest to the predicted route rather than multiple base stations 104 within a region of the user equipment 10.

In process block 220, the user equipment 10 sends an indication to transition to the target base station 104. For example, uplink data from the user equipment 10 to the base station 104 may include a request to transition to the better performing base station 104 determined by the user equipment 10. At process block 222, the base station 104 receives the indication to transition to the target base station 104. The base station 104 may start scheduling the user equipment 10 to the target base station 104 and the user equipment 10 may form a link. As such, the user equipment 10 may transition (e.g., seamlessly transition) to the target base station 104, thereby reducing or eliminating wireless service interruptions. Furthermore, the user equipment 10 may save power by reducing searching operations and the base stations 104 may also save power by reducing advertising schemes.

Figure 11:
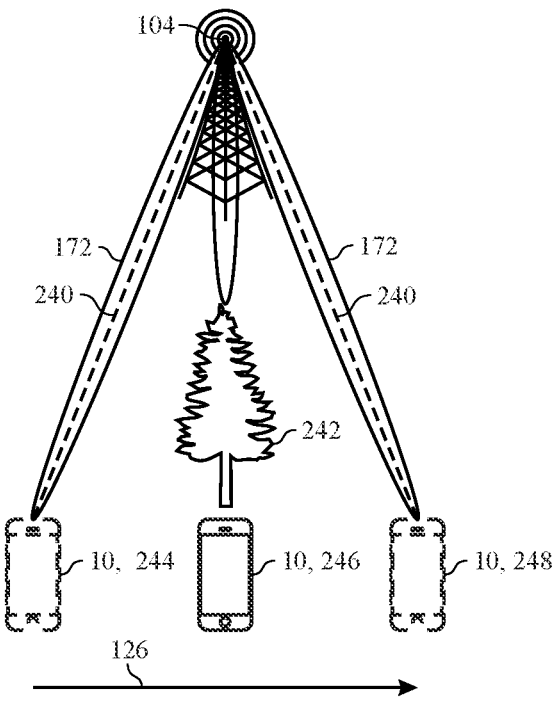
FIG. 11 is a schematic diagram of the user equipment of FIG. 1 being blocked from a base station by a stationary object, according to embodiments of the present disclosure.

In certain instances, the user equipment 10 may connect to beams 172 of the base station 104 for wireless transfer. However, the connection may be interrupted by obstructions or blockages, such as objects interfering with line of sight between the user equipment 10 and the base station 104. Temporary blockages (e.g., line of sight blockage) may easily and frequently occur in densely populated regions or during mobility scenarios. With the foregoing in mind, FIG. 11 is a schematic diagram of the user equipment 10 of FIG. 1 being blocked from communication with the base station 104 by a stationary object 242, according to embodiments of the present disclosure. The base stations 104 (via the one or more antennas 55) may be configured to emit one or more beams 172 in a directional configuration. The user equipment 10 may connect to the beam 172 and/or the base station 104 for wireless service. The connection may travel in a direct path (e.g., line of sight 240) from the base station 104 to the user equipment 10 or vice versa. The signal characteristics (e.g., strength or quality) may depend on the line of sight 240. For example, blocking all or a portion of the line of sight 240 may lead to a decrease in signal characteristics (e.g., to a point where data of the received user data may not be of sufficient level to be processed), a drop in user equipment 10 throughput, or in extreme circumstances, beam or connection failure. In the illustrated example, the line of sight 240 between the user equipment 10 and the base station 104 may be temporarily blocked by a stationary object 242 (e.g., tree).

For example, during mobility scenarios, the user equipment 10 may move behind stationary objects 242, which may result in blockages of the line of sight 240. At point 244, the user equipment 10 may begin traveling and the line of sight 240 may be clear. As such, the user equipment 10 may form a beam 172 with the base station 104 and signal characteristics of the beam 172 may be above the threshold. However, at point 246, the object 242 may interfere with the line of sight 240; as such, no beam 172 may be formed. That is, the user equipment may not form the connection with the base station 104 and the connection may fail. As the user equipment 10 continues to move, at point 246, the user equipment 10 may move past the blockage and form the beam 172 with the base station 104. In other words, the blockage from the object 242 may be gone and the line of sight 240 between the user equipment 10 and the base station 104 may be clear. As such, the beam 172 may be formed.

A duration of the blockage may be determined be dependent on a velocity of the user equipment 10 and a size of the object 242 causing the blockage. The blockage duration may be shorter if the blockage size is small or if the user equipment 10 is travelling quickly, while the blockage duration may be longer if the blockage size is large or if the user equipment 10 is travelling slowly. As further described herein, predicting the blockage duration may enable the user equipment 10 to implement more effective mobility procedures, thereby maintaining wireless service and reducing or eliminating interruptions to wireless service.

Figure 12:
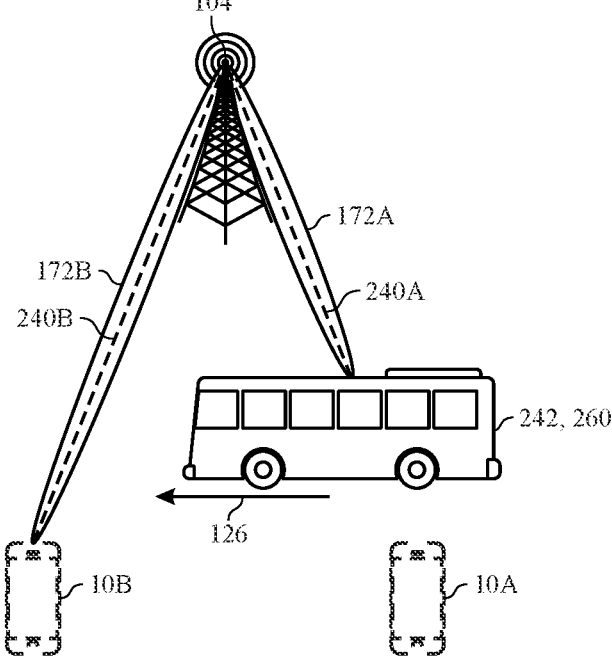
FIG. 12 is a schematic diagram of the user equipment of FIG. 1 blocked from a base station by a moving object, according to embodiments of the present disclosure.

FIG. 12 is a schematic diagram of the user equipment 10 of FIG. 1 blocked from communicating with the base station 104 by a moving object 242, according to embodiments of the present disclosure. As described herein, the connection may be formed when the line of sight 240 between the user equipment 10 and the base station 104 is clear or sufficiently clear (e.g., such that there is no obstruction blocking the line of sight 240 to affect transmitted user data from being received and data from being extracted from the user data with a bit error rate greater than a threshold bit error rate). For example, the second user equipment 10B may connect to a second beam 172B (supported by the base station 104) based on a second line of sight 240B being clear. However, in certain instances, the line of sight 240 may be blocked by the moving object 242. For example, the moving object 242 may move in a direction of travel 126 in between the first user equipment 10A and the base station 104. As such, a first line of sight 240A between the first user equipment 10A and the base station 104 may be blocked by a moving object 242 (e.g., bus 260).

The first user equipment 10A and/or the wireless network 102 may use sensing to determine blockage information. The blockage information may include a relative distance between the moving object 242 and the first user equipment 10A, a direction of travel of the moving object 242, a speed of the moving object 242, a size of the moving object 242, or the like. For example, the first user equipment 10A and/or the wireless network 102 may include and/or utilize proximity sensors, cameras, radio frequency sensors, infrared sensors, radar sensors, and so on, to determine a presence of the moving object 242 and/or the blockage information. Then, the first user equipment 10A may use the blockage information to determine a blockage duration using the speed and the size of the moving object 242. In certain instances, the first user equipment 10A may transmit a signal indicative of the blockage information to nearby user equipment 10 (e.g., the second user equipment 10B), the base station 104, and/or the wireless network 102. As such, the second user equipment 10B may receive indication of a potential blockage and implement a mobility procedure to maintain wireless service during the blockage.

Further, device-to-device communication may be utilized for blockage detection and predictions. For example, the second user equipment 10B may crowdsource information from user equipment 10 within an area surrounding the location of the user equipment 10B to predict the blockage. In another example, the first user equipment 10A may share the blockage information with the second user equipment 10B. For example, the first user equipment 10A may share a speed of the moving object 242 or the direction of travel 126 of the moving object 242. The second user equipment 10B may use the blockage information to predict a start time and a duration of the blockage (e.g., based on the blockage information received from the first user equipment 10A and/or the base station 104). If the second user equipment 10B predicts a blockage (e.g., potential blockage), then the second user equipment 10B may implement mobility procedures for the duration of the blockage to reduce or eliminate service interruptions.

Additionally or alternatively, the moving object 242 may provide the blockage information to the user equipment 10. In the illustrated example, the blockage is caused by the bus 260 interfering with the line of sight 240. An RF transceiver of the bus 260 may scan for RF signals from the base station 104 and synchronize to the base station 104. Further, the RF transceiver of the bus 260 may provide blockage information, such as a speed, a size, a location, a route of travel, a direction of travel, or the like to the base station 104. In another example, the user equipment 10 may connect to the RF transceiver of the bus 260 (e.g., via a WiFi signal) and the bus 260 may transmit a signal indicative of blockage information. In this way, the wireless network 102 and/or the user equipment 10 may predict blockages before service interruptions and implement mobility procedures to maintain network coverage and/or reduce or eliminate service interruptions.

Figure 13:
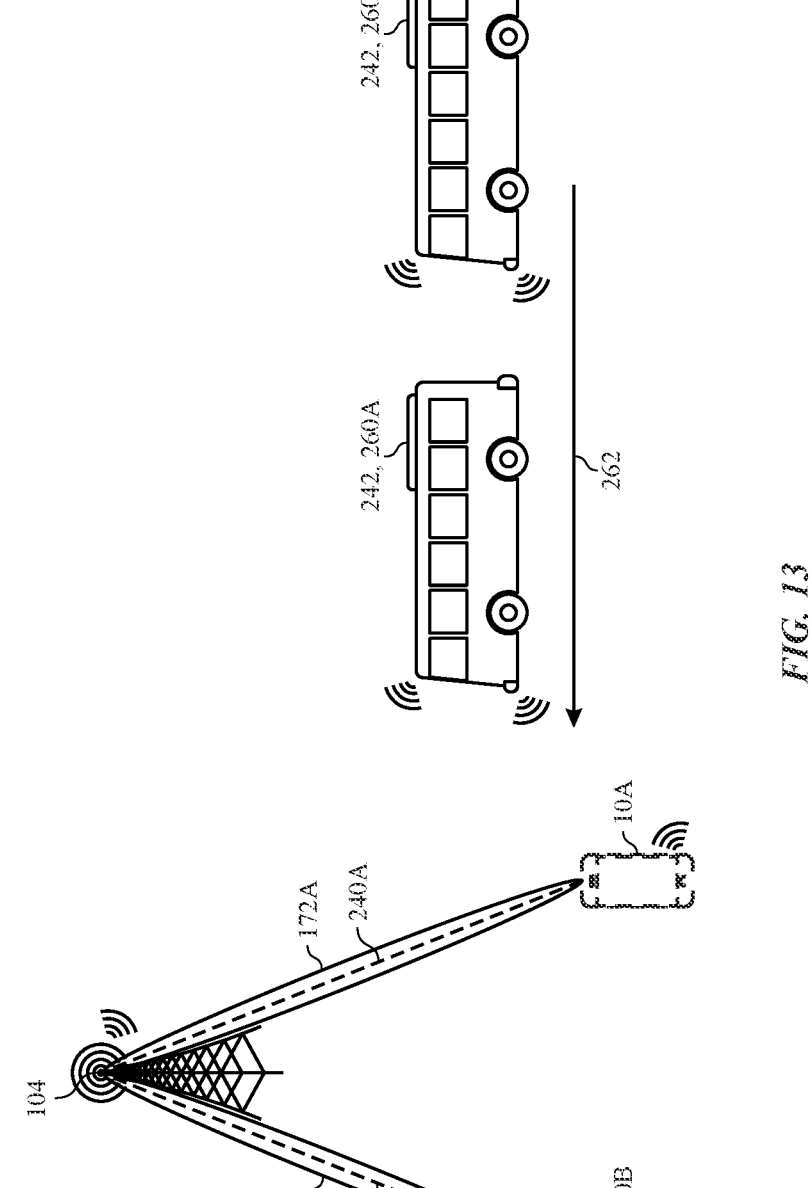
FIG. 13 is a schematic diagram of the user equipment of FIG. 1 predicting a blockage based on blockage information, according to embodiments of the present disclosure.

In certain instances, the moving object 242 may include multiple objects, thereby increasing the blockage duration. FIG. 13 is a schematic diagram of the user equipment 10 of FIG. 1 predicting a blockage (e.g., potential blockage) based on blockage information, according to embodiments of the present disclosure. For example, the moving object 242 may include multiple vehicles (e.g., first vehicle 260A, second vehicle 260B, collectively 260) traveling in the same direction 262. The vehicles 260 may exchange blockage information between the group and/or share the blockage information with the wireless network 102 and/or the user equipment 10 by platooning. As described herein, the blockage information may include a location, the direction of travel, the velocity, the size, and a number of vehicles to the first user equipment 10A. For example, the first vehicle 260A may receive blockage information from the second vehicle 260B and add its blockage information for the user equipment 10 to predict the blockage duration. The first vehicle 260A may be a master vehicle and communicate blockage information with the wireless network 102 and/or the user equipment 10. While the illustrated example includes two vehicles (e.g., one master vehicle, one additional vehicle), any suitable number of vehicles of any suitable size may cause the blockage. For example, two or more additional vehicles 260, four or more additional vehicles 260, ten or more additional vehicles 260, and so on may transmit blockage information to the master vehicle (e.g., the first vehicle 260A) while the second vehicle 242B may communicate blockage information with the first vehicle 242A.

In certain instances, the first vehicle 260A may be located closer (relative to the second vehicle 260B) to the base station 104 and/or the user equipment 10 and may send an indication of the blockage information. Based on the indication, the first user equipment 10A may determine a relative distance to the vehicles 260 and implement mobility procedures before blockage occurs. Further, the first user equipment 10A may share blockage information with other user equipment 10. For example, the first user equipment 10A may share blockage information with the second user equipment 10B (via device-to-device communication), similar to the user equipment 10 described with respect to FIG. 12. In this way, the second user equipment 10B may prepare for and mitigate signal interruptions for the duration of the blockage.

In certain instances, the second user equipment 10B may predict a blockage based on the blockage information. The second user equipment 10B may scan the base stations 104 and determine a target base station 104 that may not be blocked by the vehicles 260. The second user equipment 10B may request transition before the blockage occurs, thereby maintaining wireless service as the moving vehicles 260 pass by (e.g., interfere with the line of sight 240). Additionally or alternatively, the second user equipment 10B may request transition to a different beam 172 of the base station 104 that may not be affected by the blockage. In certain instances, the user equipment 10 may not be able to form a connection with the base station 104. The wireless network 102 may relay the connection using intelligent reflective surfaces (RIS) or a stationary relay mesh. For example, the wireless network 102 may include reflective surfaces (e.g., glass mirror, polished metal) that may reflect wireless signals (e.g., user data) from the base station 104 to a region (which may be dependent on the surface). In another example, the moving vehicles 260 may be utilized as a moving relay interconnecting the wireless network 102 and the user equipment 10 during the blockage. In other instances, the user equipment 10 may utilize cooperative communication between other user equipment 10 to relay the connection via a device-to-device connection. However, in certain instances, it may be beneficial to suspend the connection for the blockage duration and immediately resume connection after, thereby minimizing service interruptions. Predicting the blockage and the blockage duration allows for coordination between the user equipment 10 and the wireless communication network 102 to prevent unintended interruptions to wireless service and/or beam failures during to the temporary blockage.

Figure 14:
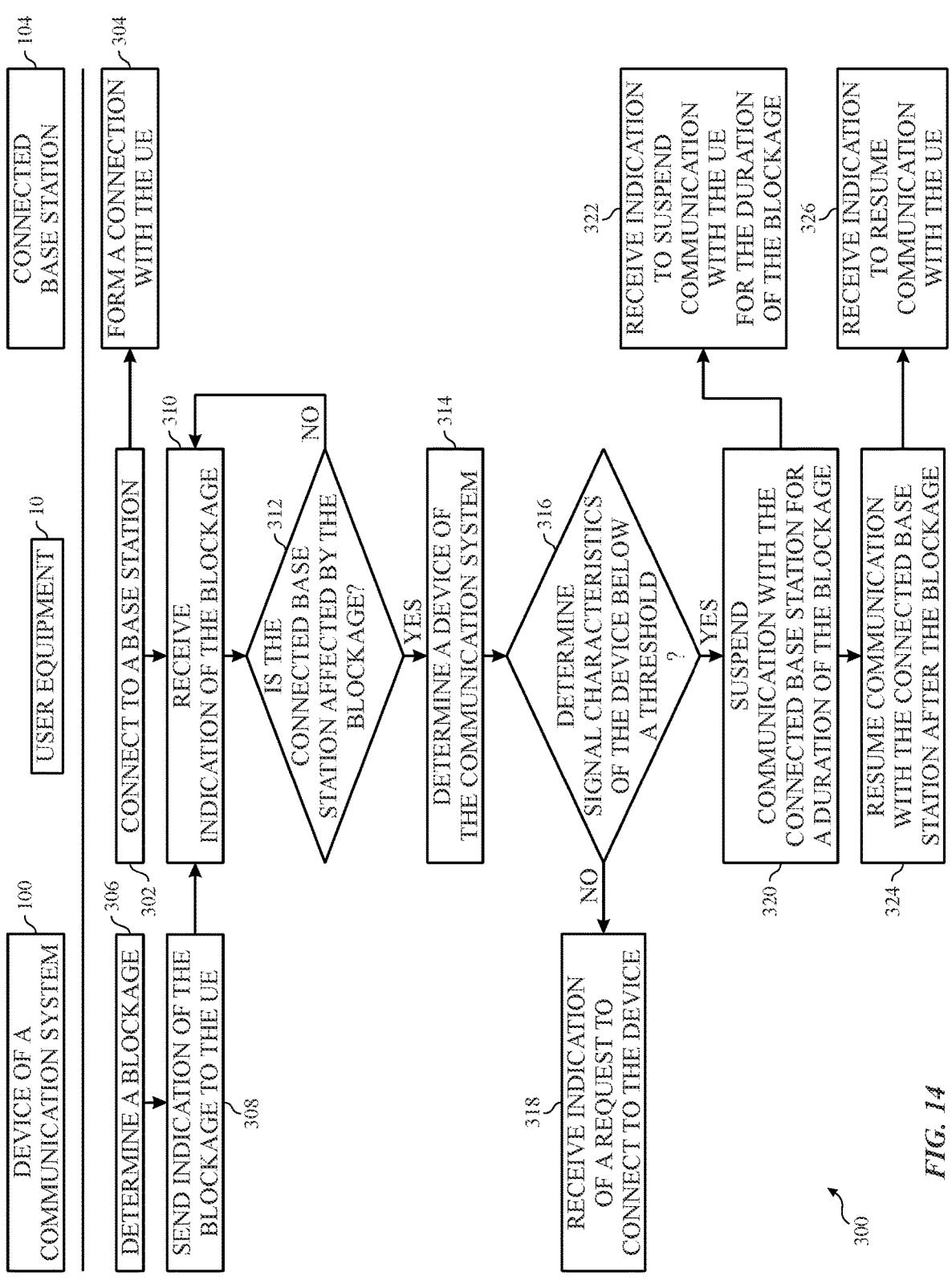
FIG. 14 is a flowchart of a method enabling the user equipment of FIG. 1 to receive indication of a blockage and implement mobility procedures, according to embodiments of the present disclosure.

FIG. 14 is a flowchart of a method 300 for enabling the user equipment 10 of FIG. 1 to receive indication of a blockage (e.g., potential blockage of the line of sight 240) and implement mobility procedures, according to embodiments of the present disclosure. Any suitable device (e.g., a controller) that may control components of the user equipment 10, the network 102, and/or the base station 104, such as the processor 12, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system of the user equipment 10, the network 74, and/or the base station 104, one or more software applications of the user equipment 10, the network 102, and/or the base station 104, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the user equipment 10 connects to a base station 104. The base station 104 may advertise radio frequency (RF) signals and the user equipment 10 may detect the base station 104 by receiving the RF signals when the user equipment 10 enters the coverage area of the base station 104 (e.g., a geographical region for which the base station provides network coverage).

In process block 304, the base station 104 forms a connection with the user equipment 10. The user equipment 10 may synchronize to the base station 104 and the base station 104 may broadcast or transmit system information indicative of frequency bands supported by the base station 104. The system information may also include timing specification, power specification, GPS or GNSS coordinates, and/or any other suitable information to enable the user equipment 10 to establish communication with the base station 104. Further, the user equipment 10 may transmit an indication of its capabilities and the base station 104 may send a configuration of uplink resources (e.g., modulation order, signal power, resource blocks, timing, and so on) and the user equipment 10 may apply the configuration for communication with the base station 104. Additionally or alternatively, the user equipment 10 may connect to a beam 172 of the base station 104.

In process block 306, a device of the communication system 100 (e.g., base station 104, user equipment 10) determines a blockage. For example, the user equipment 10, the wireless network 102, and/or the objects 242 may use sensing to standalone or jointly detect potential blockages and share the blockage information before the blockage occurs. For example, the user equipment and/or the wireless network 102 may include or utilize proximity sensors, cameras, radio frequency sensors, infrared sensors, and so on to determine the blockage information. The blockage information may include presence of a moving object, a relative distance of the moving object 242, a direction of movement, a speed of movement, or a size of the moving object 242. The blockage information may be used to determine a duration of the blockage. Additionally or alternatively, the location of the blockage may be used to determine a distance between the blockage and the user equipment 10 and/or a start time of the blockage.

In process block 308, the device of the communication system 100 sends an indication of the blockage to the user equipment 10. For example, the object 242 (e.g., vehicles 260) may transmit blockage information to the user equipment 10 and/or the base station 104. In another example, the user equipment 10 may utilize device-to-device communication to relay blockage information to other user equipment 10 within an area (e.g., within range of the utilize device-to-device communication) around the user equipment 10. Additionally or alternatively, the user equipment 10 may crowdsource information (e.g., sensing information, blockage information) from other user equipment 10 to predict a blockage. Still in another example, the wireless network 102 may receive the indication of blockage information from one or more connected user equipment(s) 10 and/or the object 242 and send the indication of the blockage information to the user equipment 10.

In process block 310, the user equipment 10 receives the indication of the blockage. For example, the user equipment 10 may receive the blockage information from other user equipment 10, the wireless network 102, the connected base station 104, or the like. Then, in decision block 312, the user equipment 10 may determine if the connected base station 104 is affected by the blockage. As described herein, the base station 104 and the user equipment 10 may transmit signals (e.g., user data) in a direct path (e.g., line of sight 240). If the line of sight 240 is blocked or partially blocked, signal characteristics may decrease. As such, it may be beneficial for the user equipment 10 to determine if the object 242 interferes with the line of sight 240 and implement mobility procedures. The user equipment 10 may predict the blockage based on the predicted location of the blockage and the location of the line of sight 240.

If the user equipment 10 determines that the connected base station 104 is not affected by the blockage, then the method 300 may return to process block 306 to determine a blockage, send an indication of the blockage to the user equipment 10, and the user equipment 10 may return to process block 310 to receive the indication of the blockage.

If the user equipment 10 determines that the connected base station 104 is affected by the blockage, then at process block 314, the user equipment 10 determines a device (e.g., base station 104, user equipment 10) of the communication system 100 for a handover. For example, the user equipment 10 may scan base stations 104, similar to process 150 described above with respect to FIG. 7. The user equipment 10 may determine a better performing base station 104 (e.g., based on signal characteristics) for connection. Additionally or alternatively, the user equipment 10 may determine a different base station 104 (e.g., a base station 104 not affected by the blockage) for temporary connection. In another example, the user equipment 10 may use device-to-device communication to determine one or more user equipment 10 within an area (e.g., a geographical region for which the user equipment 10 may transmit user data) to relay network elements for connection. Still in another example, the user equipment 10 may determine RIS surfaces within the wireless network 102 for connection.

In decision block 316, the user equipment 10 determines if signal characteristics of the device are below a threshold, similar to decision block 156 described above with respect to FIG. 7. If the signal characteristics of the device are not below the threshold, then the user equipment 10 may send an indication to transition to the device of the communication system 100. In process block 318, the device of the communication system 100 receives the indication of a request to connect. For example, the user equipment 10 may determine a target base station 104 that may not be affected by the blockage and send a request to transition. The wireless network 102 may receive the request to transition and start scheduling the user equipment 10 to the target base station 104. As such, the user equipment 10 may connect to the target base station before the blockage occurs, thereby maintaining wireless service. In another example, the user equipment 10 may determine another user equipment 10 with signal characteristics above the threshold. The user equipment 10 may utilize device-to-device communications to relay network services and maintain wireless service. Still in another example, the user equipment 10 and/or the object 242 may relay network elements using a stationary relay mesh or RIS. As such, interruptions to wireless services may be reduced or eliminated.

However, if the user equipment 10 determines that signal characteristics of the device are below the threshold, then it may be beneficial to suspend the connection for a predicted duration of the blockage. In process block 320, the user equipment 10 suspends communication with the connected base station 104 for the duration of the blockage. For example, the user equipment 10 may stop transmitting or receiving user data with the connected base station 104 during the blockage. However, the user equipment 10 may still maintain the link with the connected base station 104. In this way, the user equipment 10 may immediately resume communication after the blockage. In process block 322, the connected base station 104 receives the indication to suspend communication with the connected base station 104 for the duration of the blockage.

However, after (e.g., immediately after) the blockage, the user equipment 10 and the base station 104 may resume the connection. In process block 324, the user equipment 10 resumes communication with the connected base station 104 after the blockage. For example, the user equipment 10 may send an indication to the connected base station 104 indicative of expiration of the blockage duration. At process block 326, the connected base station 104 receives the indication to resume communication with the user equipment 10. For example, the user equipment 10 and/or the connected base station 104 may start transmitting or receiving user data from the connected base station. Coordination between the user equipment 10 and the wireless network 102 may prevent unintended wireless network interruptions due to failure due to a temporary blockage or unintended beam failure. As such, performing a mitigation procedure before the blockage may maintain network coverage by reducing signal degradation and/or service interruptions (e.g., due to a broken connection).

In one embodiment, user equipment may include one or more antennas, a transceiver coupled to the one or more antennas, and processing circuitry coupled to the transceiver. The processing circuitry may be configured to detect a first base station using the transceiver, synchronize to the first base station, and receive a first indication of a cell cluster comprising the first base station and a plurality of additional base stations using the transceiver. The processing circuitry may also be configured to send or receive user data via the one or more antennas using the transceiver to or from the first base station and receive signal characteristics of the first base station and the plurality of additional base stations. The processing circuitry may be configured to request transitioning to send or receive the user data to or from a second base station of the plurality of additional base stations based on the signal characteristics and send or receive the user data via the one or more antennas using the transceiver to or from the second base station based on a response to the request.

The processing circuitry may be configured to determine a better performing base station of the plurality of additional base stations based on the signal characteristics.

The processing circuitry may be configured to receive a second indication of an additional cell cluster using the transceiver, the additional cell cluster comprising the better performing base station and a second plurality of base stations based on moving out of a coverage area of the first base station.

The processing circuitry may be configured to receive signal characteristics of the better performing base station and the second plurality of base stations based on the second indication.

The processing circuitry may be configured to send or receive the user data via the one or more antennas using the transceiver while receiving the signal characteristics of the first base station and the plurality of additional base stations.

A computing device associated with the cell cluster or a primary base station of the cell cluster may be configured to maintain the cell cluster.

The signal characteristics may comprise a signal strength, a signal quality, a power delivery, a signal delivery, or any combination thereof.

The processing circuitry may be configured to determine a location of the user equipment and send a second indication of the location to the first base station using the transceiver.

The response may include a second indication of scheduling the user equipment on the second base station and a third indication to stop sending or receiving the user data to or from the first base station.

In another embodiment, a base station may include a transmitter, a receiver, and processing circuitry coupled to the transmitter and the receiver. The processing circuitry may be configured to receive a first indication of a location of a user equipment using the receiver, generate a cell cluster including the base station and a plurality of additional base stations within a range of the location, and transmit a second indication of the cell cluster using the transmitter. The processing circuitry may also be configured to receive a request to transition to a better performing base station of the cell cluster with respect to the user equipment, the plurality of additional base stations may include the better performing base station and schedule the user equipment to send or receive user data on the better performing base station.

The processing circuitry may be configured to generate a second cell cluster comprising the better performing base station and a second plurality of additional base stations.

The processing circuitry may be configured to generate the cell cluster based on a density of base stations within the range of the location of the user equipment.

The processing circuitry may be configured to generate the cell cluster based on a mobility type of the user equipment.

The processing circuitry may be configured to add one or more additional base stations and remove one or more base stations from the cell cluster based on the second indication.

The processing circuitry may be configured to stop transmitting or receiving the user data to or from the user equipment based on scheduling the user equipment on the better performing base station.

In yet another embodiment, a method for wireless communications may include receiving, at a user equipment, an indication of a cell cluster comprising a plurality of base stations from a base station and receiving signal characteristics from each base station of the cell cluster. The method may transmit, by the user equipment, a request to transition to a better performing base station of the cell cluster based on the signal characteristics and communicate with the better performing base station based on a response to the request.

The method may comprise receiving, at the user equipment, an indication of a second cell cluster based on the response to the request, the second cell cluster comprising the better performing base station and a second plurality of base stations.

The method may comprise receiving, at the user equipment, signal characteristics from each base station of the second cell cluster.

The method may comprise receiving, at the user equipment, an indication of scheduling the user equipment on the better performing base station.

The cell cluster may include the better performing base station.

In one embodiment, user equipment may include one or more antennas, a transceiver coupled to the one or more antennas, and processing circuitry coupled to the transceiver. The processing circuitry may be configured to detect a first base station using the transceiver, synchronize to the first base station, and send or receive user data via the one or more antennas using the transceiver to or from the first base station. The processing circuitry may also be configured to determine or receive an indication of blockage information using the transceiver, request a transition to send or receive the user data to or from a second base station based on the blockage information, and send or receive the user data via the one or more antennas using the transceiver to or from the second base station based on a response to the request.

The processing circuitry may be configured to determine a signal characteristic of the second base station is above a threshold value.

The blockage information comprises a speed of an object, a size of the object, a relative distance of the object, a speed of the user equipment, or any combination thereof.

The processing circuitry may be configured to determine the speed of the user equipment, determine the size of the object, the object comprises a stationary object, and predict a blockage based on the speed of the user equipment and the size of the object.

The processing circuitry may be configured to predict a blockage based on the blockage information, the prediction is indicative of a start time and a duration of the blockage, and at the start time, suspend sending or receiving the user data via the one or more antennas using the transceiver to or from the first base station for the duration of the blockage.

The processing circuitry may be configured to send or receive the user data via the one or more antennas using the transceiver to or from the second base station via an intelligent reflective surface or a stationary relay mesh.

The processing circuitry may be configured to send or receive the user data via the one or more antennas using the transceiver to or from one or more neighboring user equipment via device-to-device communication.

The user equipment may include one or more sensors and the processing circuitry may be configured to perform sensing operations via the one or more sensors to determine the blockage information, and send the indication the blockage information using the transceiver to the first base station, one or more neighboring user equipment, or both.

The indication of the blockage information may be transmitted by one or more neighboring user equipment, a base station, a wireless network, an object, or any combination thereof.

In another embodiment, a base station may include a transmitter, a receiver, and processing circuitry coupled to the transmitter and the receiver. The processing circuitry may be configured to receive an indication of a potential blockage of a line of sight using the receiver, the indication comprising a start time of the potential blockage and a duration of the potential blockage and transmit the start time of the potential blockage and the duration of the potential blockage to an user equipment using the transmitter. The processing circuitry may also be configured to receive a request from the user equipment to connect to a second base station based on the start time of the potential blockage and the duration of the potential blockage and transition the user equipment to the second base station.

The processing circuitry may be configured to connect to a vehicle using a Wi-Fi signal, a radio frequency (RF) signal, or any combination thereof to receive the indication of the potential blockage using the receiver.

The vehicle may include multiple vehicles, and the processing circuitry may be configured to connect to a master vehicle of the multiple vehicles to receive the indication of the potential blockage using the receiver.

The processing circuitry may be configured to suspend transmitting user data to the user equipment using the transmitter for the duration of the potential blockage, and after the duration of the potential blockage, resume transmitting the user data to the user equipment using the transmitter.

The processing circuitry may be configured to transmit the user data to the user equipment via an intelligent reflective surface or a stationary relay mesh using the transmitter.

The processing circuitry may be configured to transition the user equipment to a different beam of the base station for the duration of the potential blockage.

The processing circuitry may be configured to receive blockage information from one or more user equipment, a wireless network, an object, or any combination thereof, and transmit the blockage information to the user equipment.

In yet another embodiment, a method may include receiving, at a user equipment, blockage information from a first base station, the blockage information comprising a speed of an object, a size of the object, a relative distance of the object, or any combination thereof and predicting a line of sight blockage between the user equipment and the first base station based on the blockage information, the line of sight blockage comprising a start time and a blockage duration. The method may also transmit, by the user equipment, a request to transition to a second base station based on the prediction of the line of sight blockage.

The method may include receiving, by the user equipment, system information from the second base station based on the prediction of the line of sight blockage from the second base station, the system information comprising a signal characteristic, determining, by the user equipment, that the signal characteristic is below a threshold value, and transmitting, by the user equipment, a request to transition to a third base station.

The method may include communicatively coupling, by the user equipment, to one or more other user equipment via device-to-device communication for the blockage duration.

The method may include receiving, by the user equipment, system information from the second base station, determining a signal characteristic is above a threshold value, and communicating with to the second base station based on the signal characteristic being above the threshold value.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A user equipment, comprising:
one or more antennas;
a transceiver coupled to the one or more antennas; and
processing circuitry coupled to the transceiver and configured to
communicate user data with a first base station via the transceiver and the one or more antennas,
receive a map using the transceiver, the map indicating a location, a beam coverage area, a beam shape, and a beam direction of each base station of a plurality of base stations,
request a transition to communicate the user data with a second base station via the transceiver and the one or more antennas based on a predicted route of the user equipment and the map, and
communicate the user data with the second base station via the transceiver and the one or more antennas based on a response to the request.

2. The user equipment of claim 1, wherein the processing circuitry is configured to
determine the predicted route of the user equipment based on a location of the user equipment.

3. The user equipment of claim 2, wherein the processing circuitry is configured to
request the transition to the second base station prior to the user equipment leaving a beam coverage area of the first base station using the transceiver based on a beam coverage area of the second base station being above a threshold coverage area.

4. The user equipment of claim 2, wherein the processing circuitry is configured to
request a transition to a third base station of the plurality of base stations based on a beam coverage area of the second base station being below a threshold coverage area, the predicted route, and the map.

5. The user equipment of claim 2, wherein the processing circuitry is configured to determine the predicted route based on a historical route of the user equipment, instructions from a map software application, Global Navigation Satellite System data, or any combination thereof.

6. The user equipment of claim 1, wherein the beam shape is indicated by global navigation satellite system data.

7. The user equipment of claim 1, wherein the processing circuitry is configured to receive a portion of the map using the transceiver, the portion comprising a threshold radius surrounding a location of the user equipment.

8. The user equipment of claim 1, wherein the processing circuitry is configured to
receive the user data associated with a signal characteristic using the transceiver from each of a subset of base stations of the plurality of base stations along the predicted route of the user equipment, and
request the transition to communicate the user data with the second base station based on the signal characteristic.

9. The user equipment of claim 1, comprising a wireless network configured to generate the map based on the location of each base station of the plurality of base stations and the beam coverage area of each base station of the plurality of base stations.

10. A base station, comprising:
a transmitter;
a receiver; and
processing circuitry coupled to the transmitter and receiver, the processing circuitry configured to
generate a map indicating a location, a beam coverage area, a beam shape, and a beam direction of each base station of a plurality of base stations,
receive a first indication of a location of a user equipment using the receiver,
transmit a portion of the map to the user equipment based on the location of the user equipment using the transmitter,
receive a second indication of a request from the user equipment to transition to a second base station using the receiver, and
transition the user equipment to the second base station.

11. The base station of claim 10, wherein the processing circuitry is configured to update the map with one or more added or removed base stations indicated by a wireless network.

12. The base station of claim 10, wherein the processing circuitry is configured to
generate the portion of the map based on a threshold radius surrounding the location of the user equipment.

13. The base station of claim 10, wherein the map comprises Global Navigation Satellite System coordinates indicative of the beam coverage area of each base station of the plurality of base stations.

14. The base station of claim 10, wherein the processing circuitry is configured to
update the map with a range of a beam of each base station of the plurality of base stations based on a sensing operation.

15. A method for wireless communications comprising:
receiving, at a user equipment, a map from a first base station indicating a location, a beam coverage area, a beam shape, and a beam direction of each base station of a plurality of base stations;

predicting, by the user equipment, a route of the user equipment based on a location of the user equipment;

transmitting, by the user equipment, a request to transition to a second base station of the plurality of base stations based on the map and the predicted route; and communicating with the second base station based on a response to the request.

16. The method of claim 15, comprising:

receiving, by the user equipment, a signal characteristic from each base station of a subset of base stations of the plurality of base stations along the route; and transmitting, by the user equipment, the request to transition to the second base station based on the signal characteristic.

17. The method of claim 15, comprising, determining, by the user equipment, the beam coverage area of the second base station is above a threshold based on the route and the map.

18. The method of claim 15, comprising, transmitting, by the user equipment, an indication of the location of the user equipment to the second base station, and receiving, by the user equipment, the map from the second base station comprising a region surrounding the location of the user equipment.

19. The user equipment of claim 1, wherein the processing circuitry is configured to receive one or more signal characteristics comprising a signal strength, a signal quality, a power signal, or a signal delivery of each base station of the plurality of base stations.

20. The user equipment of claim 19, wherein the processing circuitry is configured to update radio resource management measurements, channel state information measurements, or both based on the one or more signal characteristics.

* * * * *